United States Patent
Kumar et al.

(10) Patent No.: US 11,625,955 B1
(45) Date of Patent: Apr. 11, 2023

(54) FINGERPRINT SENSOR WITH FORCE OR PRESSURE FEEDBACK

(71) Applicant: QUALCOMM Incorporated, San Diego, CA (US)

(72) Inventors: Raj Kumar, San Diego, CA (US); Chun Yiu Chu, Oakland, CA (US); Jessica Liu Strohmann, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/448,191

(22) Filed: Sep. 20, 2021

(51) Int. Cl.
| | |
|---|---|
| *G06K 9/00* | (2022.01) |
| *G06V 40/60* | (2022.01) |
| *G01L 25/00* | (2006.01) |
| *G01L 1/18* | (2006.01) |
| *G06V 10/98* | (2022.01) |
| *G06V 40/40* | (2022.01) |
| *G06V 40/50* | (2022.01) |
| *G06V 40/13* | (2022.01) |

(52) U.S. Cl.
CPC .............. *G06V 40/67* (2022.01); *G01L 1/18* (2013.01); *G01L 25/00* (2013.01); *G06V 10/993* (2022.01); *G06V 40/13* (2022.01); *G06V 40/1306* (2022.01); *G06V 40/40* (2022.01); *G06V 40/50* (2022.01)

(58) Field of Classification Search
CPC .... G06V 40/67; G06V 40/1306; G06V 40/40; G06V 10/993; G06V 40/50; G06V 40/13; G06V 40/1394; G06V 40/1365; G01L 1/18; G01L 25/00; A61B 5/4875

USPC ........................................................ 382/124
See application file for complete search history.

(56) References Cited

U.S. PATENT DOCUMENTS

| | | | |
|---|---|---|---|
| 11,087,109 B1* | 8/2021 | Strohmann | ........ G06V 40/1394 |
| 2005/0117785 A1* | 6/2005 | Boshra | ............... G06V 40/1365 |
| | | | 382/124 |
| 2016/0253544 A1 | 9/2016 | Weber et al. | |
| 2018/0276440 A1 | 9/2018 | Strohmann et al. | |
| 2018/0353109 A1* | 12/2018 | Li | ......................... A61B 5/4875 |
| 2018/0373917 A1* | 12/2018 | Sheik-Nainar | ......... G06V 40/13 |
| 2020/0210004 A1 | 7/2020 | Seo et al. | |

FOREIGN PATENT DOCUMENTS

EP          3576014 A1       12/2019

OTHER PUBLICATIONS

International Search Report and Written Opinion—PCT/US2022/074564—ISA/EPO—dated Nov. 11, 2022.

* cited by examiner

*Primary Examiner* — Abdul-Samad A Adediran
(74) *Attorney, Agent, or Firm* — Qualcomm Incorporated

(57) ABSTRACT

A method may involve controlling, via a control system, the apparatus to provide a first prompt to place a digit on an outer surface of the apparatus in a fingerprint sensor system area. The method may involve determining, via the control system, a digit force or a digit pressure of the digit on the outer surface of the apparatus. The method may involve controlling, via the control system, the apparatus to provide a second prompt corresponding to the digit force or the digit pressure.

43 Claims, 22 Drawing Sheets

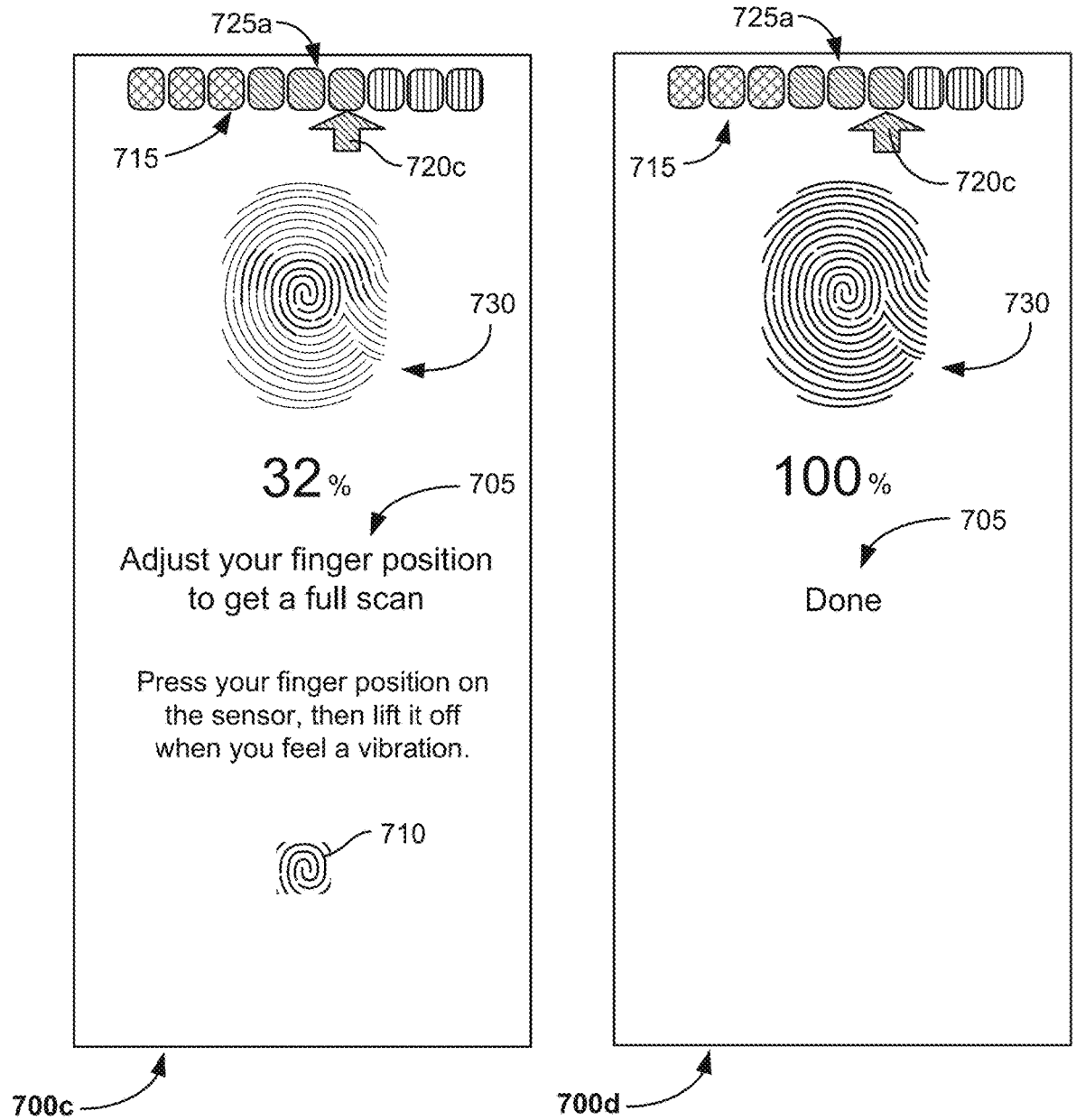

FINGERPRINT SENSOR WITH FORCE OR PRESSURE FEEDBACK

TECHNICAL FIELD

This disclosure relates generally to fingerprint sensors and methods for using such systems.

DESCRIPTION OF THE RELATED TECHNOLOGY

Fingerprint sensors, including but not limited to ultrasonic fingerprint sensors, have been included in devices such as smartphones, cash machines and cars to authenticate a user. Although some existing devices with fingerprint sensors can provide satisfactory performance, improved devices and methods for operating such devices would be desirable.

SUMMARY

The systems, methods and devices of the disclosure each have several innovative aspects, no single one of which is solely responsible for the desirable attributes disclosed herein.

Some innovative aspects of the subject matter described in this disclosure may be implemented in a method. The method may involve controlling an apparatus that includes a fingerprint sensor system. In some examples, the method may involve controlling, via a control system, the apparatus to provide a first prompt to place a digit on an outer surface of the apparatus in a fingerprint sensor system area. The method may involve determining, via the control system, a digit force or a digit pressure of the digit on the outer surface of the apparatus. The method may involve controlling, via the control system, the apparatus to provide a second prompt corresponding to the digit force or the digit pressure.

In some examples, providing the second prompt may involve presenting a graphical user interface (GUI) on a display device of the apparatus. In some such examples, the GUI may indicate a current digit force or a current digit pressure. In some examples, the GUI may indicate whether the current digit force or the current digit pressure is within an acceptable range. In some instances wherein the GUI indicates that the current digit force or the current digit pressure is not within an acceptable range, the GUI may include a prompt to change the current digit force or the current digit pressure. In some examples, the GUI may correspond with a force calibration phase or a pressure calibration phase of a user enrollment process. In some instances, the GUI may correspond with a fingerprint capture phase of a user enrollment process. According to some examples, the GUI may correspond with an authentication process.

According to some examples, providing the first prompt may involve presenting a graphical user interface (GUI) on a display device of the apparatus. In some examples, the GUI may correspond to a user enrollment process. In some instances, the GUI may indicate the fingerprint sensor system area. In some examples, the GUI may correspond to an authentication process.

In some examples, the method may involve obtaining fingerprint image data and determining an image quality metric corresponding to the fingerprint image data. According to some such examples, the second prompt may be based, at least in part, on the image quality metric. In some instances, the second prompt may indicate whether a current digit force or a current digit pressure should be changed.

According to some examples, the method may involve controlling, via the control system, the apparatus to provide a third prompt based, at least in part, on the image quality metric. In some examples, the third prompt may indicate that a finger moisture level should be changed.

In some examples, the method may involve determining an acceptable image quality force range or an acceptable image quality pressure range associated with image quality metrics that equal or exceed an image quality metric threshold. In some such examples, the method may involve associating the acceptable image quality force range or the acceptable image quality pressure range with a person. Some such methods may involve storing the acceptable image quality force range or the acceptable image quality pressure range in a memory. Some such methods may involve performing an authentication process and applying the acceptable image quality force range or the acceptable image quality pressure range during the authentication process.

According to some examples, the method may involve performing a digit enrollment process, determining digit characteristic data in addition to fingerprint image characteristic data during the digit enrollment process and storing the digit characteristic data in a memory. In some examples, the method may involve performing an authentication process and applying the digit characteristic data during the authentication process. According to some implementations, the digit characteristic data may be, or may include, one or more of digit orientation data, digit force data, digit pressure data or digit dryness data.

In some examples, the control system may determine the digit force or the digit pressure according to fingerprint sensor data received from the fingerprint sensor system. In some such examples, the fingerprint sensor data may be, or may include, ultrasonic fingerprint sensor data. According to some examples, the ultrasonic fingerprint sensor data may be received via an electrode layer proximate a piezoelectric layer. Alternatively, or additionally, in some examples the ultrasonic fingerprint sensor data may be received via an array of ultrasonic sensor pixels.

In some examples, the method may involve detecting a digit dryness condition based, at least in part, on fingerprint sensor data received from the fingerprint sensor system. Some such examples may involve controlling, via the control system, the apparatus to provide a third prompt corresponding to the digit dryness condition.

According to some examples, the method may involve performing an spoof detection process based, at least in part, on the digit force or the digit pressure.

Other innovative aspects of the subject matter described in this disclosure may be implemented in an apparatus. The apparatus may include a fingerprint sensor system, a user interface system and a control system that is configured for communication with the fingerprint sensor system and the user interface system. In some examples, at least a portion of the control system may be coupled to the fingerprint sensor system and the user interface system. In some implementations, a mobile device may be, or may include, the apparatus. For example, a mobile device may include an apparatus as disclosed herein.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured to determine whether a digit is on an outer surface of the apparatus in a fingerprint sensor system area. In some examples, responsive to determining that the digit is on the outer surface of the apparatus in the fingerprint sensor system area, the control system may be configured to receive fingerprint sensor data from the fingerprint sensor system corresponding to the digit. According to some examples, the control system may be configured to determine, according to the fingerprint sensor data, a digit force or a digit pressure of the digit on the outer surface. In some examples, the control system may be configured to control the user interface system to provide a prompt corresponding to the digit force or the digit pressure.

In some implementations, the apparatus also may include a display device. Providing the prompt may involve presenting a graphical user interface (GUI) on the display device. In some instances, the GUI may be configured to indicate a current digit force or a current digit pressure. In some examples, the GUI may be configured to indicate whether the current digit force or the current digit pressure is within an acceptable range. In some instances wherein the GUI is configured to indicate that the current digit force or the current digit pressure is not within an acceptable range, the GUI may include a prompt to change the current digit force or the current digit pressure.

In some examples, the GUI may correspond with a force calibration phase or a pressure calibration phase of a user enrollment process. According to some examples, the GUI may correspond with a fingerprint capture phase of a user enrollment process. In some examples, the GUI may correspond with an authentication process.

Still other innovative aspects of the subject matter described in this disclosure may be implemented in an apparatus. The apparatus may include a fingerprint sensor system, a user interface system and a control system that is configured for communication with the fingerprint sensor system and the user interface system. In some examples, at least a portion of the control system may be coupled to the fingerprint sensor system and the user interface system. In some implementations, a mobile device may be, or may include, the apparatus. For example, a mobile device may include an apparatus as disclosed herein.

According to some examples, the control system may be configured to control the user interface system to provide a first prompt to place a digit on an outer surface of the apparatus in a fingerprint sensor system area. In some examples, the control system may be configured to receive fingerprint sensor data from the fingerprint sensor system corresponding to the digit. In some examples, the control system may be configured to determine, based at least in part on the fingerprint sensor data, a digit force or a digit pressure of the digit on the outer surface of the apparatus. In some examples, the control system may be configured to control the user interface system to provide a second prompt corresponding to the digit force or the digit pressure.

In some implementations, the apparatus may include at least one display device. In some such implementations, providing the second prompt may involve presenting a graphical user interface (GUI) on the display device. In some examples, the GUI may be configured to indicate a current digit force or a current digit pressure. According to some examples, the GUI may be configured to indicate whether the current digit force or the current digit pressure is within an acceptable range.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon. For example, the software may include instructions for controlling one or more devices to perform one or more of the methods disclosed herein.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIGS. 7A, 7B, 7C and 7D show examples of GUIs that may be presented during a fingerprint capture phase of a user enrollment process.

DETAILED DESCRIPTION

Figure 1A:
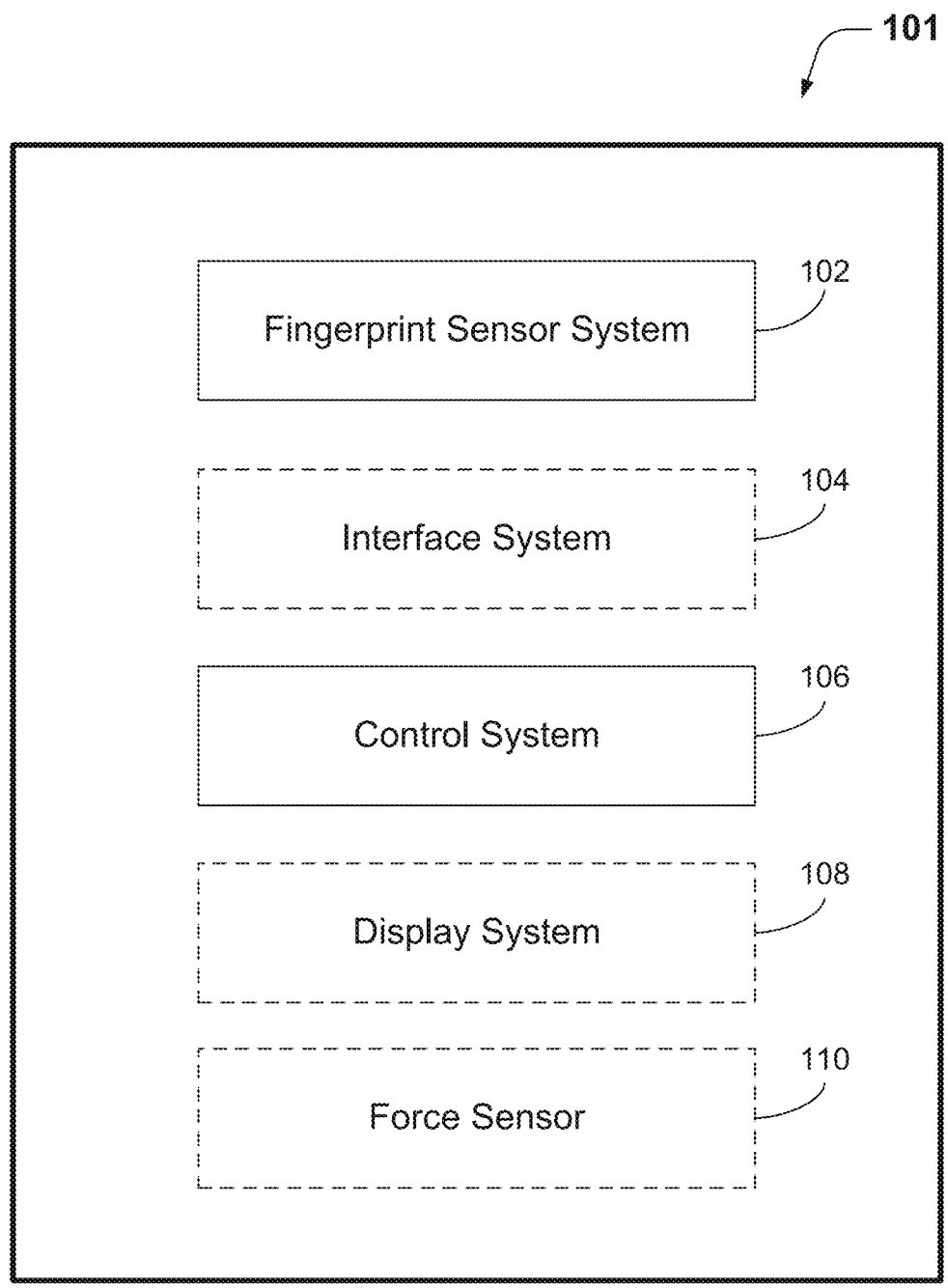
FIG. 1A is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, automobile doors, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Poor coupling of a finger to an outer surface of a device in a fingerprint sensor area is a common problem. (As used herein, the term "finger" can refer to any digit, including a thumb. Accordingly, the term "fingerprint" as used herein may refer to a print from any digit, including a thumb.) Poor coupling can occur when the finger is dry and/or when low finger force or pressure is applied. However, if the finger force or pressure is too high, degradation of fingerprint image quality may occur. Such degradation of fingerprint image quality may be caused by distortion of fingerprint features (e.g., distortion of fingerprint ridges). In some instances (e.g., in devices that include relatively large-area fingerprint sensors, such as fingerprint sensors that occupy a substantial portion of a display area), if the finger force or pressure is too high, degradation of fingerprint image quality may occur because of distortion of the fingerprint sensor itself.

In some implementations, an apparatus may include a fingerprint sensor system (which may in some instances be an ultrasonic fingerprint sensor system), a control system and a user interface system. The user interface system may, for example, include a display system, one or more loudspeakers, a touch and/or gesture sensor system, etc. According to some examples, the control system may be configured to provide a first prompt, via the user interface system, to place a digit on an outer surface of the apparatus in a fingerprint sensor system area. In some examples, the control system may be configured to determine whether a digit is on an outer surface of the apparatus in a fingerprint sensor system area, with or without a prompt. According to some examples, upon determining that a digit is on the outer surface of the apparatus in the fingerprint sensor system area, the control system may be configured to determine (e.g., according to fingerprint sensor data corresponding to the digit) a digit force or a digit pressure of the digit on the outer surface. According to some examples, the control system may be configured to provide a second prompt, via the user interface system, corresponding to (e.g., indicating) the digit force or the digit pressure. In some such examples, the second prompt may involve presenting a graphical user interface (GUI) on a display device. The GUI may, for example, indicate whether the current digit force or the current digit pressure is within an acceptable range. If the GUI indicates that the current digit force or the current digit pressure is not within an acceptable range, the GUI may include a prompt to change the current digit force or the current digit pressure.

Particular implementations of the subject matter described in this disclosure may be implemented to realize one or more of the following potential advantages. According to some examples, prompts relating to a current digit force or a current digit pressure may be part of a user enrollment process, e.g., part of a force calibration phase or a pressure calibration phase of the user enrollment process or part of a fingerprint data capturing phase of the user enrollment process. However, in some instances prompts relating to a current digit force or a current digit pressure may be part of a post-enrollment authentication process. Feedback relating to the current digit force or the current digit pressure may indicate whether the current digit force or the current digit pressure is too low, too high or in an acceptable range for obtaining fingerprint data from a fingerprint sensor. In some instances, the feedback may be based on both fingerprint image quality and digit force or pressure. In some examples, the control system may be configured to determine an optimal range of digit force or pressure that corresponds with a highest level, or a highest range, of fingerprint image quality. By prompting a user to apply finger force or finger pressure in an optimal range, fingerprint image quality may be enhanced.

The optimal force or pressure range may vary from person to person and even from digit to digit. For example, if a digit is relatively dry, a relatively higher pressure may be required to achieve an acceptable fingerprint image quality. Some implementations may involve detecting a digit dryness condition. Some such examples may involve providing a user prompt (e.g., to apply moisturizer) responsive to detecting a digit dryness condition.

Accordingly, by providing feedback relating to the current digit force or the current digit pressure, in some examples a relatively higher level of fingerprint image quality may be obtained than without such feedback. Moreover, by providing feedback relating to the current digit force or the current digit pressure, in some examples a user may be taught an optimal range of digit force or pressure via feedback provided via the apparatus, which may be audio, visual and/or haptic feedback. The optimal range of digit force or pressure may, in some instances, be saved in a memory as one characteristic of that user and/or that user's digit. Some implementations may involve determining and saving other digit characteristics. Some such examples involve using one or more of such digit characteristics during an authentication process.

Although force and pressure are different, in that pressure is force per unit of area, the terms "force" and "pressure" may sometimes be used interchangeably herein.

According to experiments conducted by the present inventors, the image quality of fingerprint images obtained via an ultrasonic fingerprint sensor generally increases according to the force with which the imaged finger is pressed against the outer surface of the ultrasonic fingerprint sensor, or against the outer surface of a device that includes the ultrasonic fingerprint sensor, up to an optimal force or pressure range beyond which the image quality generally declines. However, a dry finger generally needs to be pressed against the surface with a relatively larger force to obtain the same fingerprint image quality as a fingerprint image obtained from a normal finger. For example, in some instances a dry finger would need to be pressed against the surface with two or three times the force in order to obtain the same fingerprint image quality as a fingerprint image obtained from a normal finger.

FIG. 1A is a block diagram that shows example components of an apparatus according to some disclosed implementations. As with other disclosed implementations, the types, number and arrangement of elements shown in FIG. 1A are merely presented by way of example. Other implementations may have other types, numbers and/or arrangements of elements. In this example, the apparatus 101 includes a fingerprint sensor system 102 and a control system 106. Some implementations of the apparatus 101 may include an interface system 104, a display system and/or a force sensor 110.

The fingerprint sensor system 102 may be any suitable type of fingerprint sensor system, such as an optical fingerprint sensor system, a capacitive fingerprint sensor system, a resistive fingerprint sensor system, a radio frequency-based fingerprint sensor system, etc. In some examples the fingerprint sensor system may be, or may include, an ultrasonic fingerprint sensor system. Some detailed examples are provided herein.

Some implementations of the apparatus 101 may include an interface system 104. In some examples, the interface system 104 may include a wireless interface system. In some implementations, the interface system 104 may include a user interface system, one or more network interfaces, one or more interfaces between the control system 106 and a memory system, and/or one or more interfaces between the control system 106 and one or more external device interfaces (e.g., ports or applications processors).

The interface system 104 may be configured to provide communication (which may include wired or wireless communication, such as electrical communication, radio communication, etc.) between components of the apparatus 101. In some such examples, the interface system 104 may be configured to provide communication between the control system 106 and the fingerprint sensor system 102, between the control system 106 and the display system 108 (if present) and between the control system 106 and the force sensor 110 (if present). According to some such examples, the interface system 104 may couple at least a portion of the control system 106 to the fingerprint sensor system 102 (as well as the display system 108 and/or the force sensor 110, if present), e.g., via electrically conducting material such as conductive metal wires or traces.

According to some examples, the interface system 104 may be configured to provide communication between the apparatus 101 and other devices and/or human beings. In some such examples, the interface system 104 may include one or more user interfaces. The user interface system 104 may, for example, include one or more loudspeakers, a touch and/or gesture sensor system, a haptic feedback system, etc. Although not shown as such in FIG. 1A or FIG. 1B, the optional display system 108 may be considered to be part of the interface system 104.

The interface system 104 may, in some examples, include one or more network interfaces and/or one or more external device interfaces (such as one or more universal serial bus (USB) interfaces and/or a serial peripheral interface (SPI)). In some implementations, the apparatus 101 may include a memory system in addition to memory that the control system 106 may include. The interface system 104 may, in some examples, include at least one interface between the control system 106 and the memory system.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 may include a dedicated component for controlling the fingerprint sensor system 102 (as well as the display system 108 and/or the force sensor 110, if present). The control system 106 also may include (and/or be configured for communication with) one or more memory devices, such as one or more random access memory (RAM) devices, read-only memory (ROM) devices, etc. Accordingly, the apparatus 101 may have a memory system that includes one or more memory devices, though the memory system is not shown in FIG. 1A or FIG. 1B. In some implementations, functionality of the control system 106 may be partitioned between one or more controllers or processors, such as between a dedicated sensor controller and an applications processor of a mobile device. Some examples are described below.

The force sensor 110, if present in the apparatus 101, may be a piezo-resistive sensor, a capacitive sensor, a thin film sensor (e.g., a polymer-based thin film sensor), or another type of suitable force sensor. If the force sensor 110 includes a piezo-resistive sensor, the piezo-resistive sensor may include silicon, metal, polysilicon and/or glass. The fingerprint sensor system 102 and the force sensor 110 may, in some instances, be mechanically coupled. In some such examples, the force sensor 110 may be integrated into circuitry of the fingerprint sensor system 102. However, in other implementations the force sensor 110 may be separate from the fingerprint sensor system 102. The fingerprint sensor system 102 and the force sensor 110 may, in some examples, be indirectly coupled. For example, the fingerprint sensor system 102 and the force sensor 110 each may be coupled to a portion of the apparatus 101. In some such examples, the fingerprint sensor system 102 and the force sensor 110 each may be coupled to a portion of the control system.

However, some implementations may not include a force sensor 110 that is separate from the fingerprint sensor system 102. In some such examples, the control system 106 may be configured for force detection and/or pressure detection based, at least in part, on fingerprint sensor data from the fingerprint sensor system 102.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 1B:
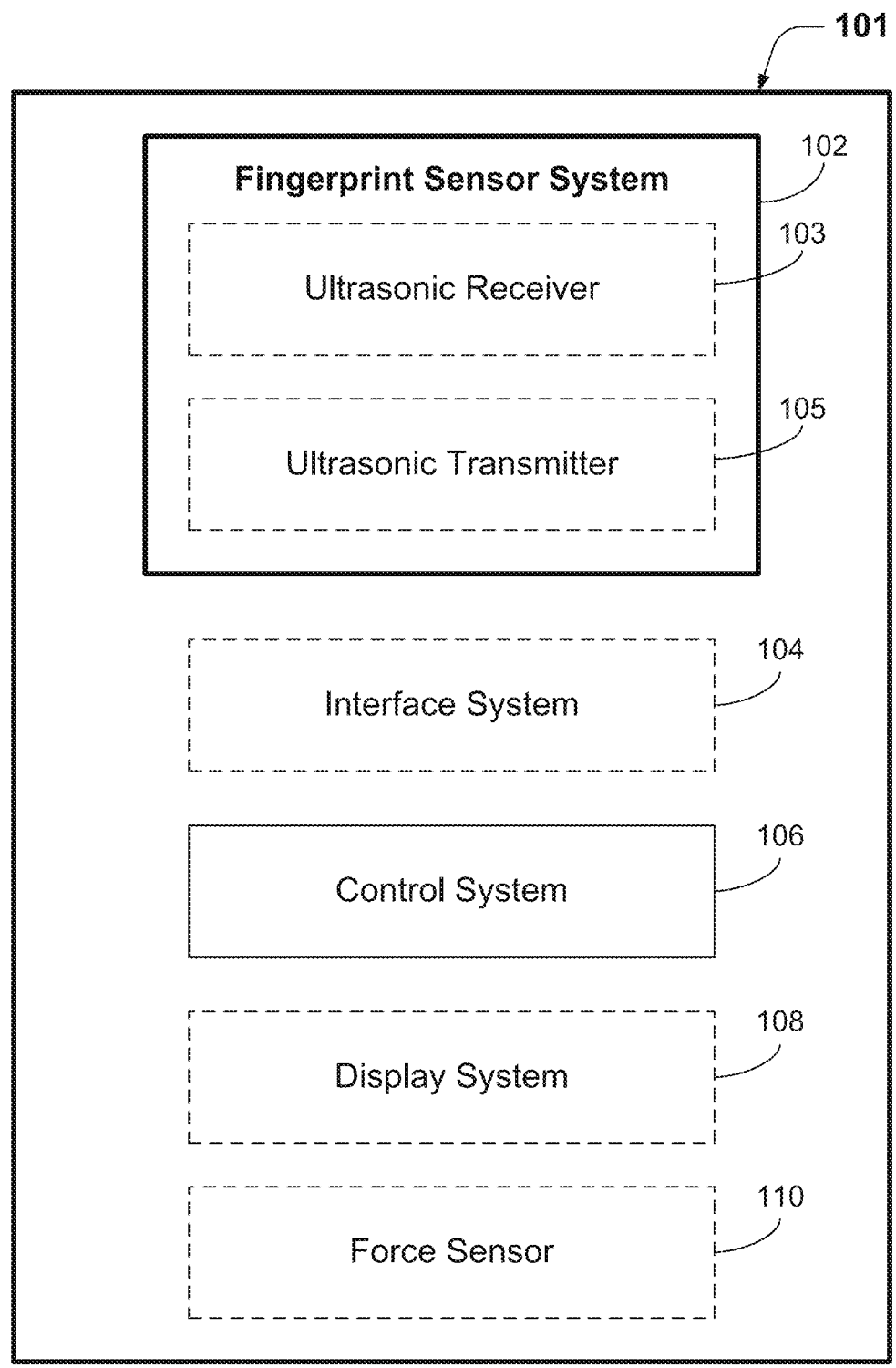
FIG. 1B is a block diagram that shows example components of the apparatus of FIG. 1A according to some disclosed implementations.

FIG. 1B is a block diagram that shows example components of the apparatus of FIG. 1A according to some disclosed implementations. In this example, the apparatus 101 includes the same elements that are described above with reference to FIG. 1A. Accordingly, unless noted otherwise, the elements of FIG. 1B may be assumed to be as described above with reference to FIG. 1A.

However, in this implementation, the fingerprint sensor system 102 is, or includes, an ultrasonic fingerprint sensor system. In some examples, as suggested by the dashed lines within the fingerprint sensor system 102, the fingerprint sensor system 102 may include an ultrasonic receiver 103 and a separate ultrasonic transmitter 105. In some such examples, the ultrasonic transmitter 105 may include an ultrasonic plane-wave generator, such as those described below.

Various examples of ultrasonic fingerprint sensors 102 are disclosed herein, some of which may include an ultrasonic receiver 103 and a separate ultrasonic transmitter 105 and some of which may not. Although shown as separate elements in FIG. 1B, in some implementations the ultrasonic receiver 103 and the ultrasonic transmitter 105 may be combined in an ultrasonic transceiver system. For example, in some implementations, the fingerprint sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. In some implementations that include a piezoelectric layer, other piezoelectric materials may be used in the piezoelectric layer, such as aluminum nitride (AlN) or lead zirconate titanate (PZT). The fingerprint sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers. A PMUT or CMUT array may include one or more microstructures such as diaphragms, plates, membranes or ribbons that may be actuated piezoelectrically. A deposited thin-film piezoelectric layer and associated electrodes formed on, in or under the microstructure may serve to actuate the microstructure in one or more modes to generate ultrasonic waves. Ultrasonic waves at higher frequencies (smaller wavelengths) may be used to detect a stylus or other small or finely featured object placed on the display surface. In some implementations, a high density (e.g., about 500 pixels per inch) of PMUT and/or CMUT elements in an array of sufficient size may be used to detect a tip of a stylus and/or image the ridges and valleys of a fingerprint for verification or authentication of a user. The PMUT and/or CMUT elements may be used as ultrasonic receivers, configured to detect ultrasonic waves that may be received after being reflected from an object in air or on the surface of the display.

If the apparatus 101 includes an ultrasonic transmitter 105 that is separate from the ultrasonic receiver 103, the interface system 104 may be configured to provide communication between at least a portion of the control system 106 and the ultrasonic transmitter 105 and between at least a portion of the control system 106 and the ultrasonic receiver 103.

The control system 106 may be configured for receiving and processing data from the fingerprint sensor system 102, e.g., from the ultrasonic receiver 103. If the apparatus 101 includes a separate ultrasonic transmitter 105, the control system 106 may be configured for controlling the ultrasonic transmitter 105, e.g., as disclosed elsewhere herein.

Figure 2:
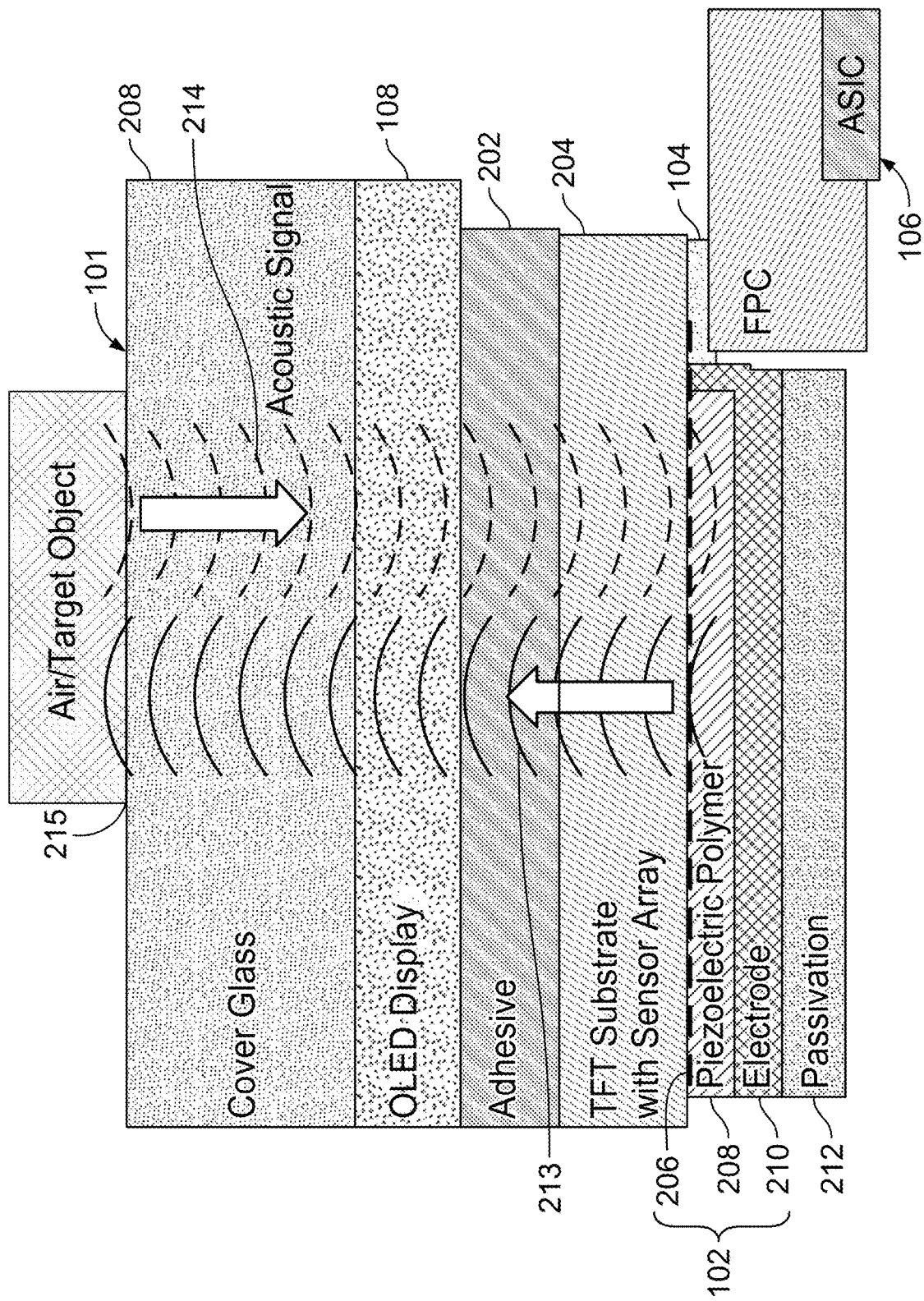
FIG. 2 shows a cross-section of an apparatus according to some disclosed implementations.

FIG. 2 shows a cross-section of an apparatus according to some disclosed implementations. As with other disclosed implementations, the types, numbers and arrangements of elements, as well as the dimensions of elements, are merely examples. According to this example, the apparatus 101 is configured to perform at least some of the methods disclosed herein. According to this implementation, the apparatus 101 has an ultrasonic sensor system 102 that includes a piezoelectric layer 208, an electrode layer 210 on one side of the piezoelectric layer 208 and an array of sensor pixels 206 on a second and opposing side of the piezoelectric layer 208. In this implementation, the piezoelectric layer 208 is an ultrasonic transceiver layer that includes one or more piezoelectric polymers.

According to this example, the electrode layer 210 resides between a passivation layer 212 and the piezoelectric layer 208. In some examples, passivation layer 212 may include an adhesive, such as an epoxy film, a polymer layer (such as a polyethylene terephthalate (PET) layer), etc.

In this implementation, the TFT layer 204 includes a TFT substrate and circuitry for the array of sensor pixels 206. The TFT layer 204 may be a type of metal-oxide-semiconductor field-effect transistor (MOSFET) made by depositing thin films of an active semiconductor layer as well as a dielectric layer and metallic contacts over a TFT substrate. In some examples, the TFT substrate may be a non-conductive material such as glass.

In this example, the apparatus 101 includes a display system 108, which includes an OLED display in this instance. Here, the OLED display is attached to the TFT layer 204 via an adhesive layer 202.

According to this implementation, the TFT layer 204, the array of sensor pixels 206 and the electrode layer 210 are electrically coupled to at least a portion of the control system 106 and one side of the ultrasonic transceiver layer 101 via a portion of the interface system 104, which includes electrically conducting material and a flexible printed circuit (FPC) in this instance.

In this example, the apparatus 101 is configured to perform at least some of the methods disclosed herein. In this example, the control system 106 is configured to control the ultrasonic sensor system 102 to transmit one or more ultrasonic waves 213. According to this example, the ultrasonic wave(s) 213 are transmitted through the TFT layer 204, the OLED display and the cover 208. According to this example, at least some reflections 214 of the ultrasonic wave(s) 213 are caused by acoustic impedance contrast at (or near) the interface 215 between the outer surface of the cover 208 and whatever is in contact with the outer surface, which may be air or the surface of a target object, such as the ridges and valleys of a fingerprint, etc. (As used herein, the term "finger" may refer to any digit, including a thumb. Accordingly, a thumbprint will be considered a type of "fingerprint.") In some examples, at least some reflections 214 of the ultrasonic wave(s) 213 are caused by acoustic impedance contrasts within a target object, such as a finger. Such impedance contrasts may correspond with sub-epidermal features such as papillary layer features, reticular layer features, subcutis features, blood vessel features, lymph vessel features, fat lobule features, muscle tissue features, bone features, etc.

According to some examples, reflections 214 of the ultrasonic wave(s) 213 may be detected by the electrode layer 210. Corresponding ultrasonic signals may be provided to the control system 106. In some such implementations, reflections 214 corresponding to a cover/air interface may be detected by the electrode layer 210 and corresponding background ultrasonic signals may be provided to the control system 106. In some such implementations, ultrasonic signals that are used by the control system 106 for fingerprint-based authentication may be based on reflections 214 from a cover/finger interface that are detected by the array of sensor pixels 206.

In some examples, the control system 106 may be configured for estimating a target object force or pressure (such as a digit force or pressure) based on fingerprint sensor data received from the fingerprint sensor system 102. In some such examples, the fingerprint sensor data may correspond to signals received from the array of sensor pixels 206. Alternatively, or additionally, the fingerprint sensor data may correspond to signals received from the electrode layer 210.

Human skin has biometric characteristics that vary from person to person. One such characteristic is the moisture content of the skin surface. These characteristics may also change as a person ages. For example, as humans get older, the outer epidermal layer of their fingers gets dryer. According to some examples, the control system 106 may be configured for estimating a digit moisture level based on fingerprint sensor data received from the fingerprint sensor system 102. In some examples, the control system 106 may be configured for detecting a digit dryness condition based on fingerprint sensor data received from the fingerprint sensor system 102. In some such examples, the fingerprint sensor data may correspond to signals received from the array of sensor pixels 206. Alternatively, or additionally, the fingerprint sensor data may correspond to signals received from the electrode layer 210. In other implementations, the fingerprint sensor data may correspond to signals received from another type of fingerprint sensor, such as a capacitive fingerprint sensor, an optical fingerprint sensor, etc.

For example, the control system 106 may be configured for estimating a digit dryness condition according to a pattern recognition process that uses fingerprint sensor data as input. In some examples, the pattern recognition process may involve a process of recognizing epidermal features associated with dry skin, such as epidermal cracks, epidermal flakes, peeling skin, etc.

According to some examples, the pattern recognition process may involve a process of recognizing features indicating poor coupling of a finger and a surface that can be associated with dry skin, such as "leopard spot" patterns. When applied to an outer surface of a device in a fingerprint sensor area (e.g., to a cover glass or a platen), a dry finger will generally have relatively lower surface contact between the finger ridges and the surface than a normal finger or a moist finger. This relatively lower surface contact can produce leopard-like spot defects in a fingerprint image produced by a fingerprint sensor. Such spots may, for example, appear as discontinuities in what may actually be continuous fingerprint ridges or other fingerprint features.

In some implementations, the control system 106 may be configured for detecting or estimating a digit dryness condition by implementing a neural network that has been trained to recognize one or more epidermal features associated with a skin condition, such as an oily skin condition, a dry skin condition, a normal skin condition, etc. According to some such implementations, the neural network may use fingerprint sensor data as input.

Figure 3:
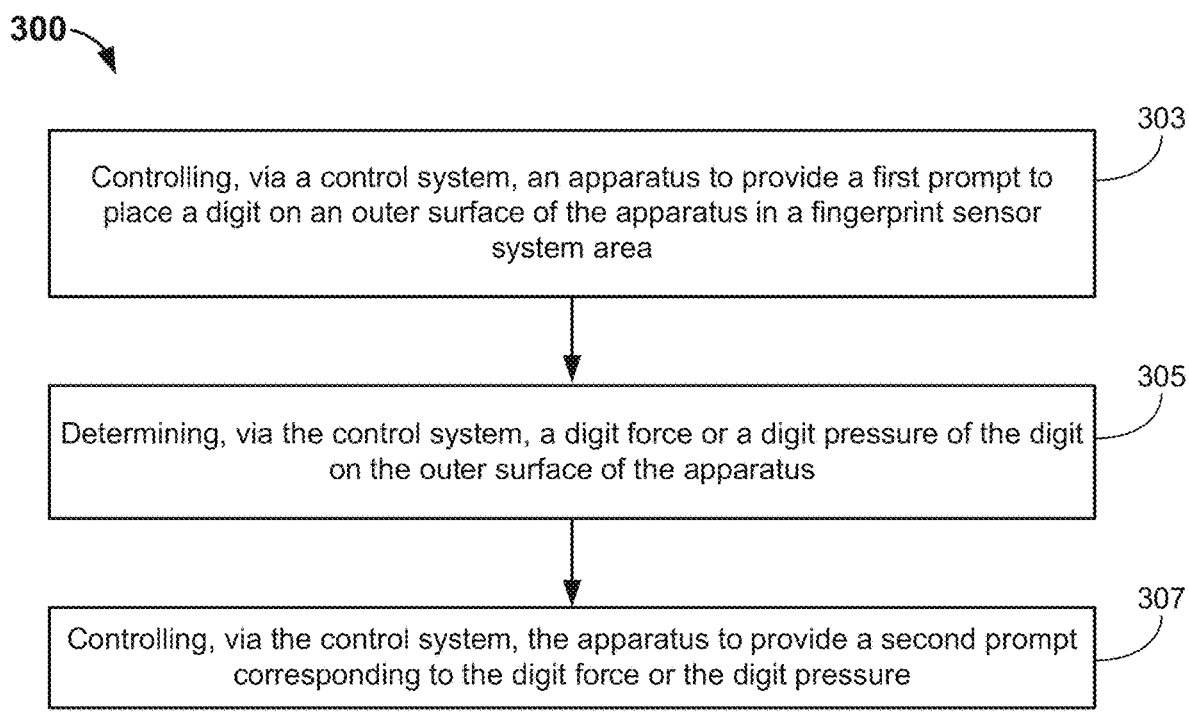
FIG. 3 is a flow diagram that provides example blocks of some methods disclosed herein.

FIG. 3 is a flow diagram that provides example blocks of some methods disclosed herein. The blocks of FIG. 3 may, for example, be performed by the apparatus 101 of FIG. 1A, FIG. 1B or FIG. 2, or by a similar apparatus. As with other methods disclosed herein, the method 300 outlined in FIG. 3 may include more or fewer blocks than indicated. Moreover, the blocks of methods disclosed herein are not necessarily performed in the order indicated. In some examples, some blocks of methods disclosed herein may be performed concurrently.

According to this example, the method 300 is a method of controlling an apparatus that includes a fingerprint sensor, which may or may not be an ultrasonic fingerprint sensor depending on the particular implementation. According to this implementation, block 303 involves controlling, via a control system of the apparatus (such as the control system 106 of the apparatus 101), the apparatus to provide a first prompt to place a digit on an outer surface of the apparatus in a fingerprint sensor system area. In some examples, block 303 may involve controlling at least a portion of a user interface system (e.g., a loudspeaker system of the apparatus 101) to provide the first prompt. In some instances, block 303 may involve controlling a display device of the apparatus (which may be an instance of the optional display system 108 of FIG. 1A) to provide the first prompt.

Figure 4A:
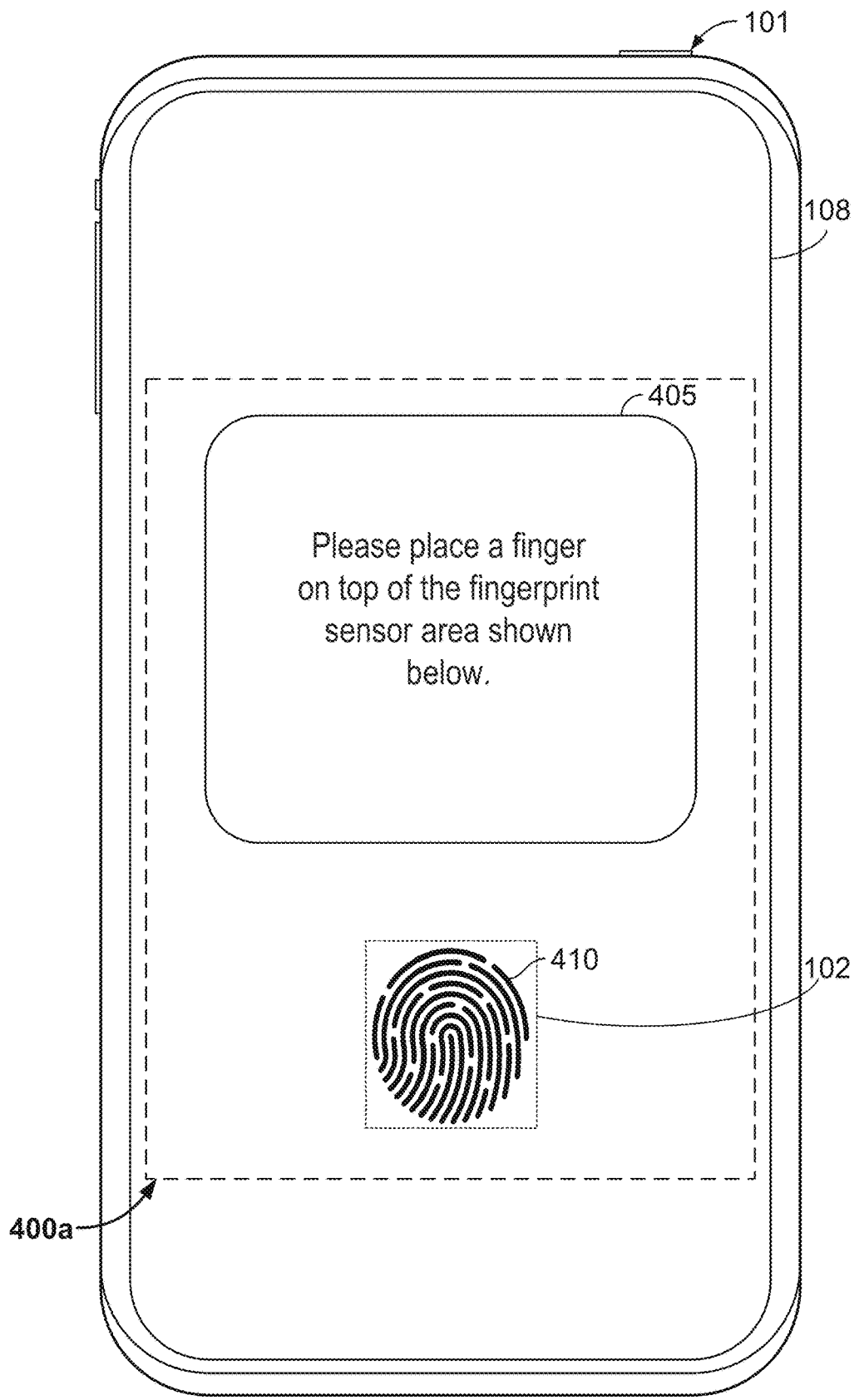
FIGS. 4A, 4B, 4C and 4D show examples of graphical user interfaces (GUIs) that may be presented during a process of implementing the method 300 according to some examples.

FIGS. 4A, 4B, 4C and 4D show examples of graphical user interfaces (GUIs) that may be presented during a process of implementing the method 300 according to some examples. In these examples, the apparatus 101 includes an instance of the fingerprint sensor system 102, an instance of the control system 106 (not shown) and an instance of the display system 108. A dashed outline of one example of an active area of the fingerprint sensor system 102 is shown in FIG. 4A. (The dashed lines in FIGS. 4A-4D are not intended to represent portions of the GUIs that would actually be presented on the display system 108 and visible to a user.) The active area may, for example, correspond with the areal extent of an array of sensor pixels of the fingerprint sensor system 102, such as the areal extent of the array of sensor pixels 206 shown in FIG. 2. In some implementations, an active area of the fingerprint sensor system 102 may be larger or smaller than the fingerprint sensor system 102 shown in FIG. 4A, may have a different aspect ratio, etc. For example, in some instances an active area of the fingerprint sensor system 102 may occupy a substantial portion of the display system 108, e.g., 10%, 20%, 30%, 40%, 50%, etc.

According to the examples shown in FIGS. 4A-4D, the control system 106 is controlling the display system 108 to present GUIs 400a, 400b, 400c and 400d, respectively, each of which includes a message area 405 and a fingerprint sensor system area icon 410. Accordingly, in these examples a display stack of the display system 108 resides between the active area of the fingerprint sensor system 102 and the outer surface of the apparatus 101 corresponding to the fingerprint sensor system area icon 410, which is a display cover (e.g., a display glass) in these examples. In these examples, the active area of the fingerprint sensor system 102 roughly corresponds with the fingerprint sensor system area icon 410.

Returning to FIG. 3, in this example block 305 involves determining, via the control system, a digit force or a digit pressure of the digit on the outer surface of the apparatus. In some examples, the control system may determine the digit force or the digit pressure according to fingerprint sensor data received from the fingerprint sensor system. According to some such examples, the fingerprint sensor data may be, or may include, ultrasonic fingerprint sensor data. In some such examples, the ultrasonic fingerprint sensor data may be received via an electrode layer proximate a piezoelectric layer of an ultrasonic fingerprint sensor system. Alternatively, or additionally, in some examples the ultrasonic fingerprint sensor data may be received via an array of ultrasonic sensor pixels. Some detailed examples for estimating digit force or digit pressure according to fingerprint sensor data are disclosed herein. However, in some implementations block 305 may involve determining a digit force or a digit pressure according to force sensor data from a force sensor (such as the optional force sensor 110 of FIG. 1A or FIG. 1B) that may be separate from the fingerprint sensor system 102.

According to this example block 307 involves controlling, via the control system, the apparatus to provide a second prompt corresponding to the digit force or the digit pressure. In some examples, the second prompt may be, or may include, an audio prompt made via a loudspeaker system of the apparatus 101 and/or haptic feedback from a haptic feedback system of the apparatus 101. Alternatively, or additionally, in some examples the second prompt may include a visual prompt made via a display system.

For example, providing the second prompt may involve presenting a GUI on a display device of the apparatus. The GUI may, for example, indicate a current digit force or a current digit pressure. The GUI may, in some instances, indicate whether the current digit force or the current digit pressure is within an acceptable range. However, in some instances, the GUI may indicate that the current digit force or the current digit pressure is not within an acceptable range. According to some such examples, the GUI may include a prompt to change the current digit force or the current digit pressure.

Figure 4B:
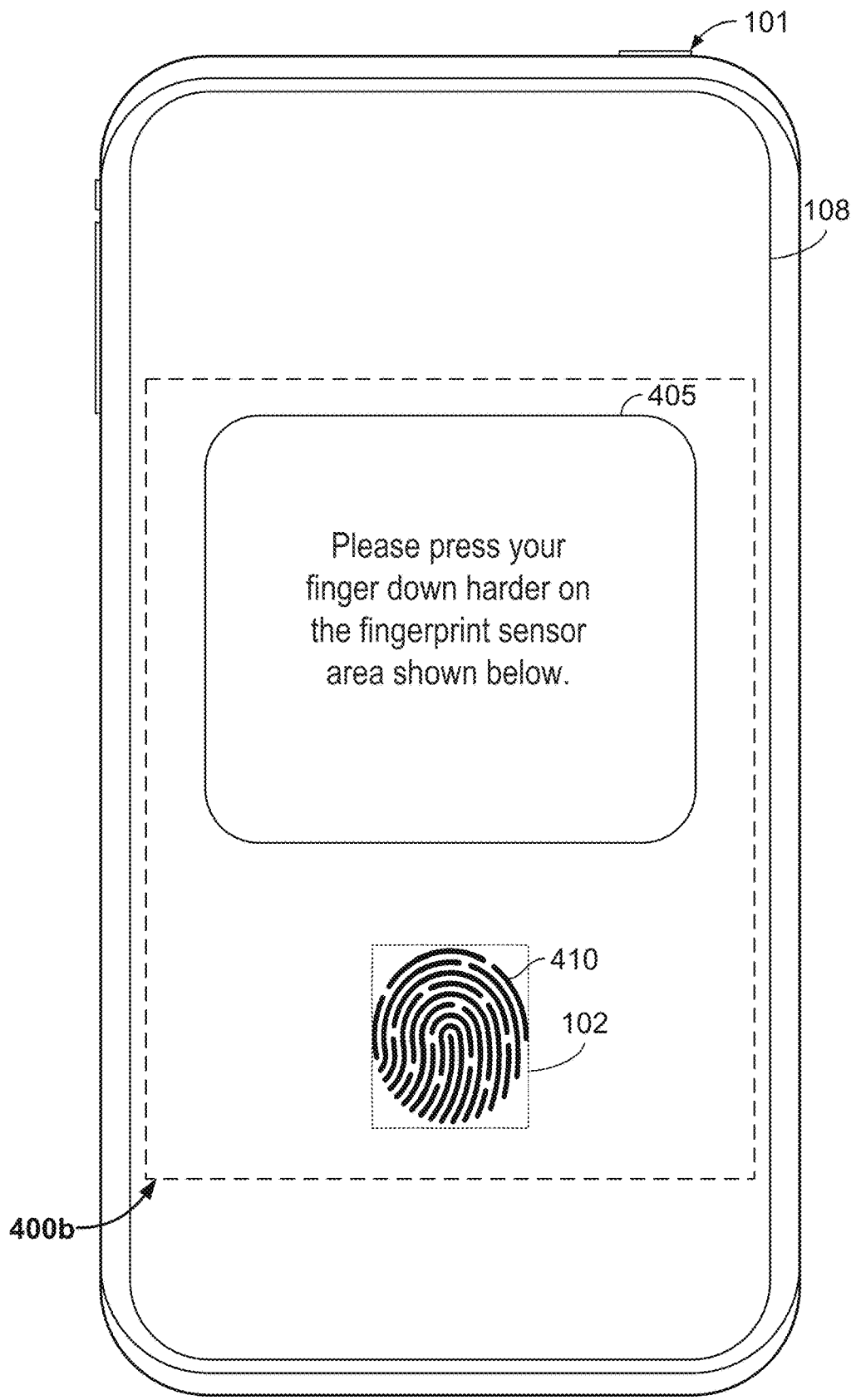

In the example shown in FIG. 4B, the control system 106 (not shown) is controlling the display system 108 to present a GUI 400b, which includes a message area 405 and a fingerprint sensor system area icon 410. According to this example, the message area 405 includes a textual prompt for the user to press the user's finger down harder on the outer surface of the apparatus 101 corresponding to the fingerprint sensor system area icon 410. By implication, the message area 405 is indicating that the current digit force or the current digit pressure is not within an acceptable range, but instead is too low.

Figure 4C:
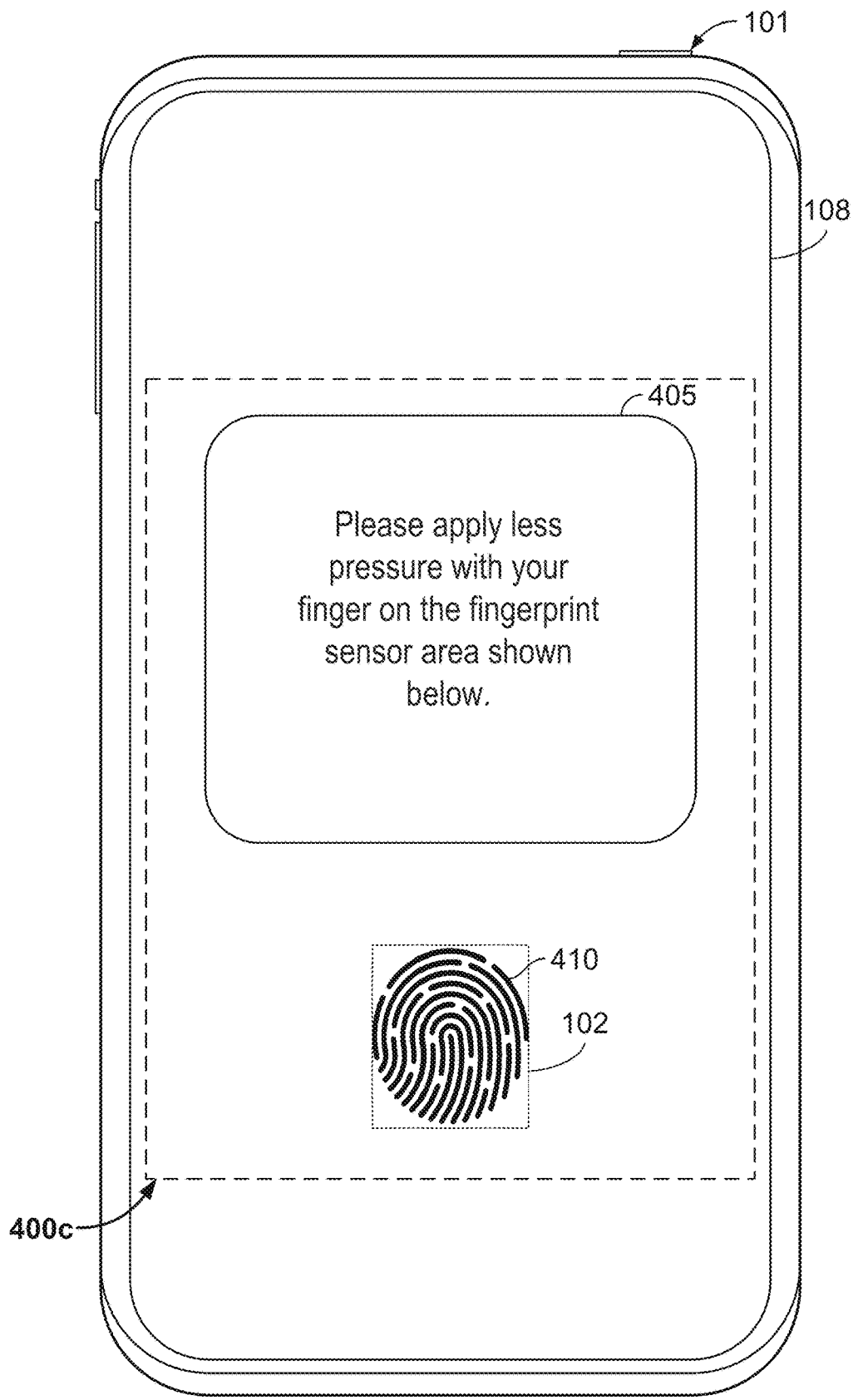

In the example shown in FIG. 4C, the message area 405 of GUI 400c includes a textual prompt for the user to apply less pressure to the user's finger on the outer surface of the apparatus 101 corresponding to the fingerprint sensor system area icon 410. By implication, the message area 405 is indicating that the current digit force or the current digit pressure is not within an acceptable range, but instead is too high.

Figure 4D:
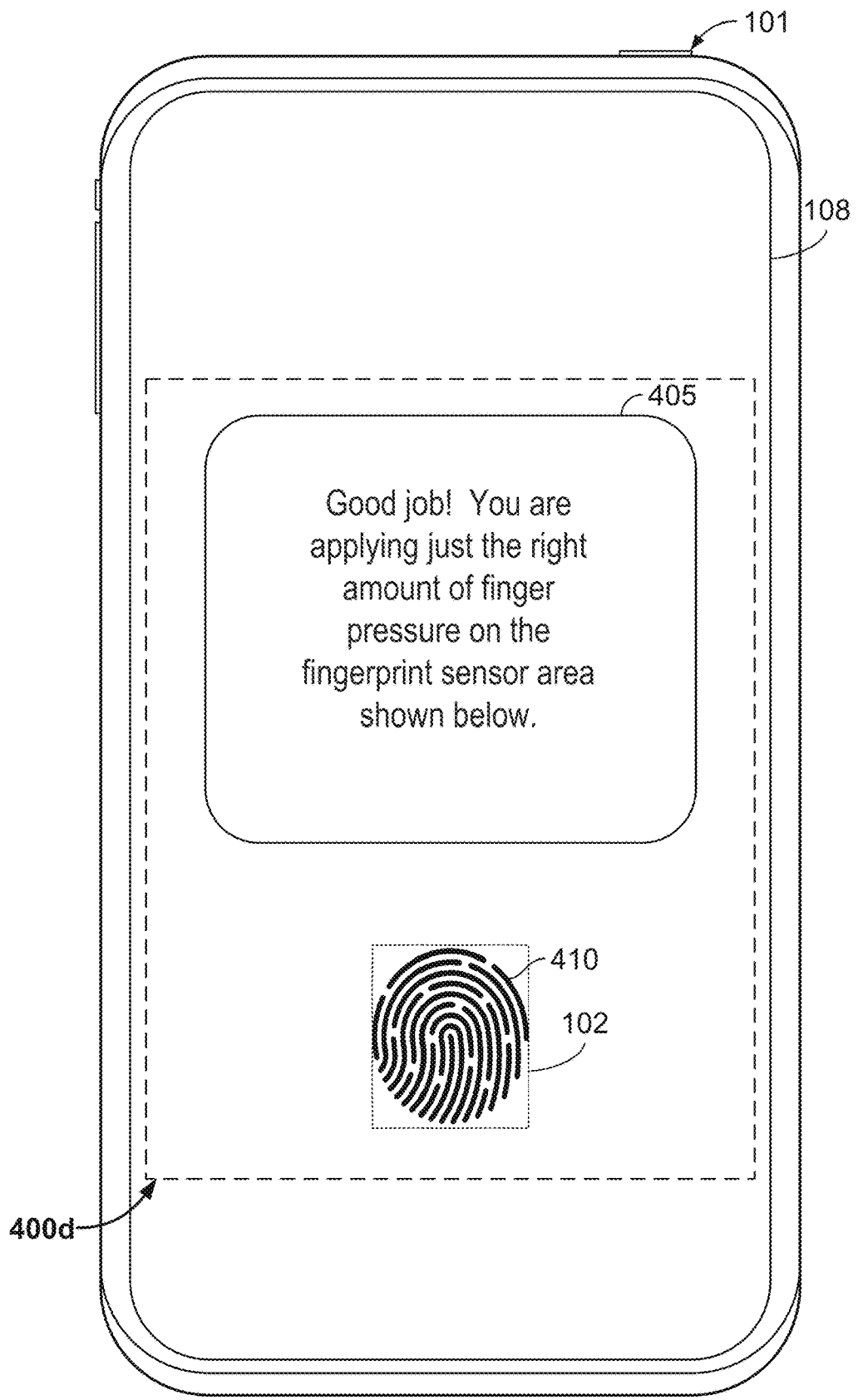

In the example shown in FIG. 4D, the message area 405 of GUI 400d includes textual feedback indicating that the user's finger is applying a satisfactory amount of pressure on the outer surface of the apparatus 101 corresponding to the fingerprint sensor system area icon 410. Accordingly, the message area 405 is indicating that the current digit force or the current digit pressure is within an acceptable range.

In some examples, the first prompt and/or the second prompt referenced in FIG. 3 may be presented during a user enrollment process. According to some such examples, the second prompt may correspond with a force calibration phase or a pressure calibration phase of a user enrollment process. For example, one or more of the GUIs shown in FIGS. 4A-4D may be presented during a force calibration phase or a pressure calibration phase of a user enrollment process.

In some examples, the first prompt and/or the second prompt may correspond with a fingerprint capture phase of a user enrollment process. For example, one or more of the GUIs shown in FIGS. 4A-4D may be presented during a fingerprint capture phase of a user enrollment process.

However, in some examples the first prompt and/or the second prompt may be presented after an enrollment process, e.g., as part of an authentication process. For example, one or more of the GUIs shown in FIGS. 4A-4D may be presented during the authentication process.

In some implementations, method 300 may involve obtaining fingerprint image data based on signals received from the fingerprint sensor system 102. Some implementations of method 300 may involve determining an image quality metric corresponding to the fingerprint image data. According to some implementations, determining the image quality metric may involve evaluating the fingerprint image data and making a signal and/or noise determination, such as a signal-to-noise ratio determination. Signal-to-noise ratios (SNRs) may be determined, for example, by dividing the relative amplitude of fingerprint sensor data corresponding to ridges of a fingerprint by the amplitude of the background (such as valleys of a fingerprint or from sensor data with no object positioned on the sensor platen). In some implementations, determining the image quality metric may involve evaluating image contrast and/or image sharpness. Image contrast may be determined, for example, by comparing the magnitude of the ridge data with the magnitude of the valley data, such as by generating a ratio between one or more ridges and one or more valleys of the fingerprint image data. Image sharpness may be determined, for example, by comparing the magnitudes of ridge data and valley data and dividing by the number of sensor pixels between an edge of a ridge and the floor of a valley. According to some implementations, determining the image quality metric may involve evaluating the fingerprint image data to determine a topology of curves corresponding to ridge and valley structures. Some such implementations may involve determining a curve orientation field. In some examples, determining the image quality metric may involve evaluating metrics such as the orientation of ridge flow, the clarity of ridge flow and/or ridge flow continuity. In some implementations, determining the image quality metric may involve evaluating the fingerprint image data for the existence of one or more fingerprint features such as minutia points. A topology of curves corresponding to ridges and valleys may be determined, for example, by constructing a vector field associated with the angular direction of the ridges and valleys disposed on an outer surface of a device in an active area of the fingerprint sensor system 102. A curve orientation field may be determined, for example, by constructing a vector field associated with the curvature of the ridges and valleys (e.g., a relatively straight ridge or valley may have a small curvature and a highly curved ridge or valley such as a whorl may have a high curvature). Image quality metrics such as the orientation of ridge flow, the clarity of ridge flow, and/or ridge flow continuity may be determined, for example, by examining the angular direction, length, continuity and curvature of ridges within the fingerprint sensor data to assess whether a sufficient number of features are available to allow successful matching and/or to identify good images for enrollment templates.

According to some examples, the second prompt of method 300 may be based, at least in part, on the image quality metric. In some such examples, the second prompt may indicate whether a current digit force or a current digit pressure should be changed.

In some implementations, method 300 may involve controlling, via the control system, the apparatus to provide a third prompt based, at least in part, on the image quality metric. The third prompt may, for example, indicate that a finger moisture level should be changed. For example, the third prompt may be, or may include, a text on a GUI prompting a user to apply moisturizer to the finger.

In some implementations, other types of digit characteristics may be determined and stored during an enrollment process, in addition to fingerprint image characteristic data (e.g., in addition to identifying and storing fingerprint features such as fingerprint ridge endings, fingerprint ridge bifurcations, short ridges and/or islands, and the locations of such fingerprint features). Such other digit characteristics may be determined and stored as digit characteristic data. The digit characteristic data may, for example, include digit orientation data, digit force data, digit pressure data or digit dryness data.

According to some such examples, a subsequent authentication process may be based, at least in part, on one or more types of digit characteristic data. If it is determined during the authentication process that a currently-determined digit characteristic does not match a digit characteristic that was determined during an enrollment process, even if the currently-obtained fingerprint features match fingerprint features that were previously acquired and stored during an enrollment process, this may be an indication of a spoof attempt. In some implementations, this condition may trigger a more rigorous authentication procedure, such as a requirement that a user enter a code, answer questions that were part of an enrollment process and/or provide another type of biometric data, such as facial recognition data.

Some implementations of method 300 may involve determining (e.g., during an enrollment process) an acceptable image quality force range or an acceptable image quality pressure range associated with image quality metrics that equal or exceed an image quality metric threshold. In some instances, the acceptable image quality force range or the acceptable image quality pressure range may be a force or pressure range corresponding with a maximum level of observed image quality. As noted elsewhere herein, due to the differences in finger characteristics from person to person, an individual (and/or an individual's particular digit) may have a characteristic acceptable image quality force range or an acceptable image quality pressure range associated with an acceptable fingerprint image quality. Some implementations may involve associating the acceptable image quality force range or the acceptable image quality pressure range with a person (and/or with a particular digit of the person) and storing the acceptable image quality force range or the acceptable image quality pressure range in a memory.

Some such examples may involve performing a subsequent authentication process and applying the acceptable image quality force range or the acceptable image quality pressure range as part of the authentication process. For example, the authentication process may be primarily based on matching currently-determined fingerprint features determined via a fingerprint sensor system with fingerprint features that were stored during an enrollment process. However, if it is determined during the authentication process that a currently-determined force or pressure does not match an acceptable image quality force range or an acceptable image quality pressure range that was determined during an enrollment process, this may be an indication of a spoof attempt and may trigger a more rigorous authentication procedure.

Figure 5:
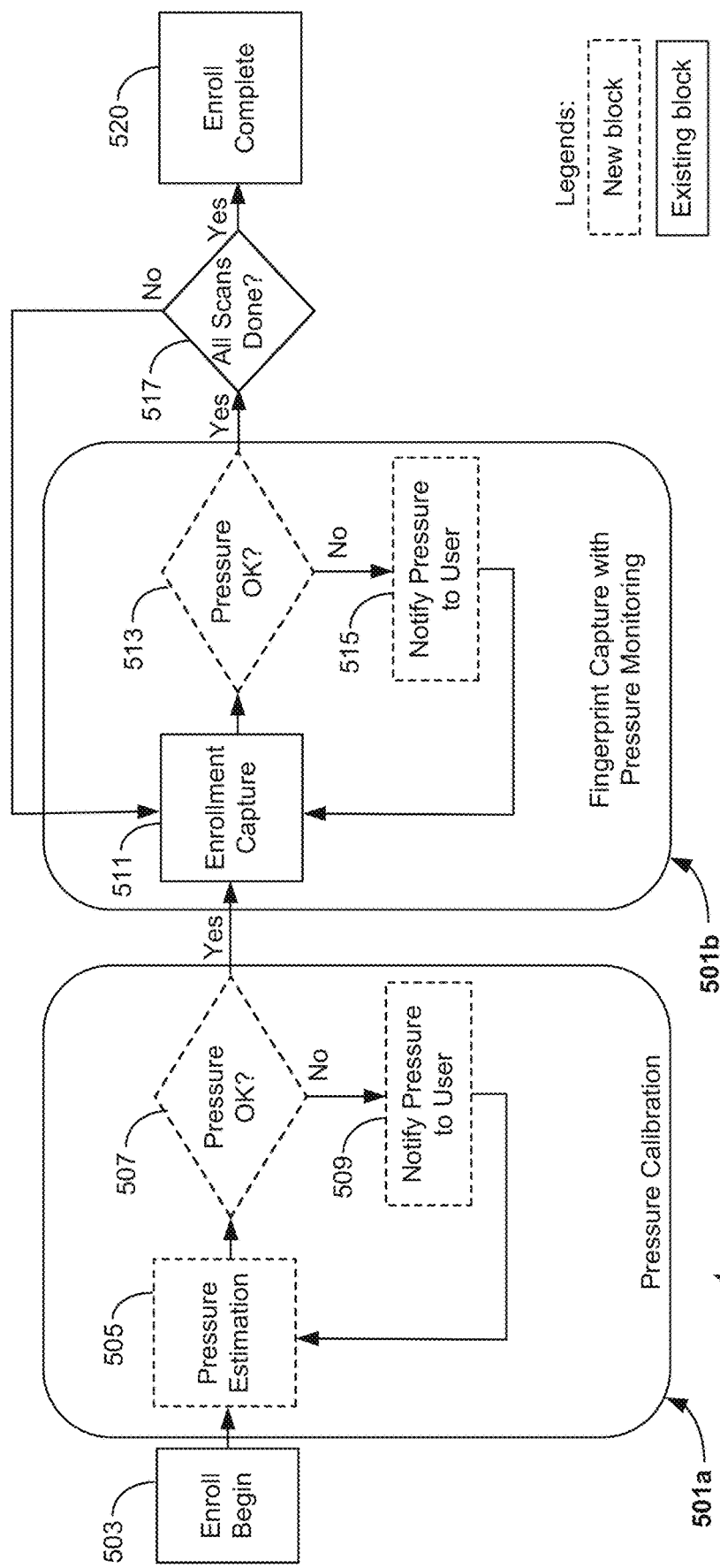
FIG. 5 is a flow diagram that provides example blocks of some additional methods disclosed herein.

FIG. 5 is a flow diagram that provides example blocks of some additional methods disclosed herein. The blocks of FIG. 5 may, for example, be performed by the apparatus 101 of FIG. 1A, FIG. 1B or FIG. 2, or by a similar apparatus. As with other methods disclosed herein, the method 500 outlined in FIG. 5 may include more or fewer blocks than indicated. Moreover, the blocks of methods disclosed herein are not necessarily performed in the order indicated. In some examples, some blocks of methods disclosed herein may be performed concurrently.

According to this example, the method 500 is a method of controlling an apparatus that includes a fingerprint sensor, which may or may not be an ultrasonic fingerprint sensor depending on the particular implementation. In this example, the method 500 corresponds to a user enrollment process that involves phases 501a and 501b. In this implementation, phase 501a is a pressure calibration phase of the user enrollment process and phase 501b is a fingerprint capture phase of the user enrollment process. As noted in more detail below, the fingerprint capture phase 501b involves pressure monitoring.

According to this implementation, block 503 involves controlling, via a control system of the apparatus (such as the control system 106 of the apparatus 101), the apparatus to initiate the user enrollment process. Block 503 may, for example, involve providing a prompt such as the first prompt discussed above with reference to FIG. 3: the first prompt may be a prompt to place a digit on an outer surface of the apparatus in a fingerprint sensor system area. In some examples, block 503 may involve controlling at least a portion of a user interface system (e.g., a loudspeaker system of the apparatus 101) to provide the first prompt. In some instances, block 503 may involve controlling a display device of the apparatus (which may be an instance of the optional display system 108 of FIG. 1A) to provide the first prompt. The first prompt may, for example, be provided via a GUI, such as the GUI 400 that is described above with reference to FIG. 4.

In this example, block 505 involves a process of estimating the pressure of a digit on an outer surface of an apparatus in an active area of a fingerprint sensor system. As noted elsewhere herein, the terms "force" and "pressure" may be used interchangeably herein. In some examples, block 505 may be a force estimation process. Block 505 may, for example, involve one or more of the examples of force estimation processes that are provided below.

According to this example, block 507 involves determining whether the pressure estimated in block 505 is within an acceptable range. In some examples, block 505 or block 507 may involve obtaining fingerprint image data via a fingerprint sensor system. According to some implementations, block 507 may involve evaluating the quality of the fingerprint image data. Some implementations may involve determining an acceptable image quality force range or an acceptable image quality pressure range associated with image quality metrics that equal or exceed an image quality metric threshold. As noted elsewhere herein, due to the differences in finger characteristics from person to person, an individual (and/or an individual's particular digit) may have a characteristic acceptable image quality force range or an acceptable image quality pressure range associated with an acceptable fingerprint image quality. Therefore, in some examples, the acceptable image quality force range or acceptable image quality pressure range used for the evaluation process of block 507 may differ according to the particular individual, or even according to the particular digit, that is being enrolled.

According to this example, if it is determined in block 507 that the digit pressure is not in an acceptable range, method 500 continues to block 509, wherein the control system causes the apparatus 101 to provide a prompt (such as an audio prompt, a haptic feedback response and/or a GUI) indicating that the digit pressure is not in an acceptable range.

In some implementations (e.g., as described above with reference to FIG. 4D), if it is determined in block 507 that the digit pressure is in an acceptable range, the control system may cause the apparatus to provide a prompt (such as an audio prompt and/or a GUI) indicating that the digit pressure is in an acceptable range. In some examples, if it is determined in block 507 that the digit pressure is in an acceptable range, method 500 continues to the fingerprint capture phase 501b. However, according to some implementations, blocks 505, 507 and 509 may need to be performed for a minimum number of times (e.g., 2 times, 3 times, 4 times, 5 times, 6 times, etc.) before method 500 continues to the fingerprint capture phase 501b. In some such examples, method 500 may proceed from block 507 to block 509 even if the digit pressure is in an acceptable range.

Figure 6C:
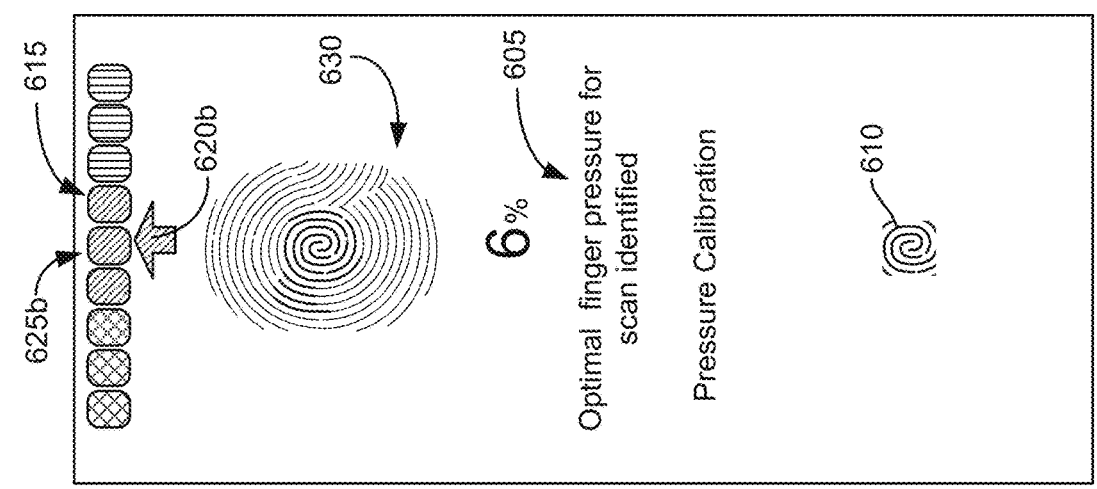
FIGS. 6A, 6B and 6C show examples of GUIs that may be presented during a pressure calibration phase of a user enrollment process.
Figure 6B:
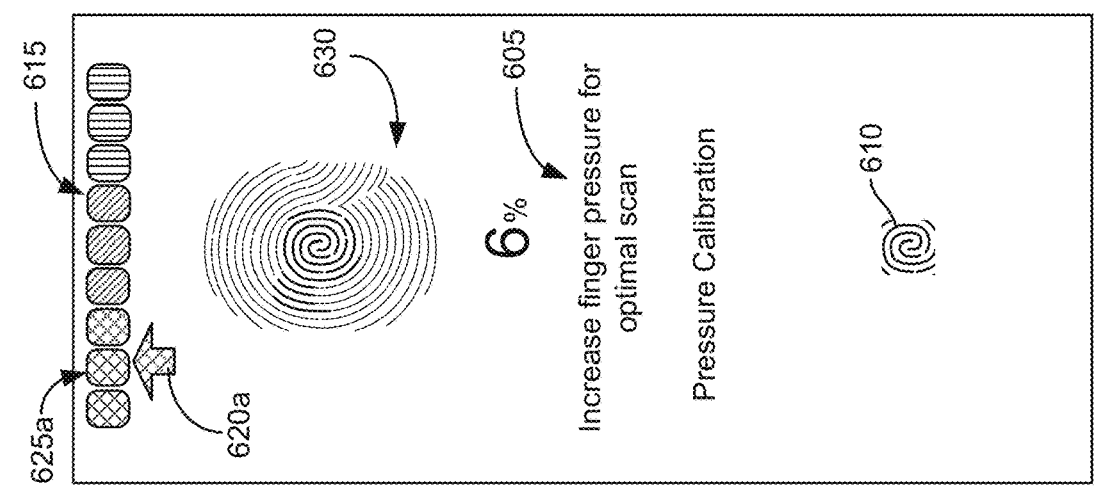
Figure 6A:
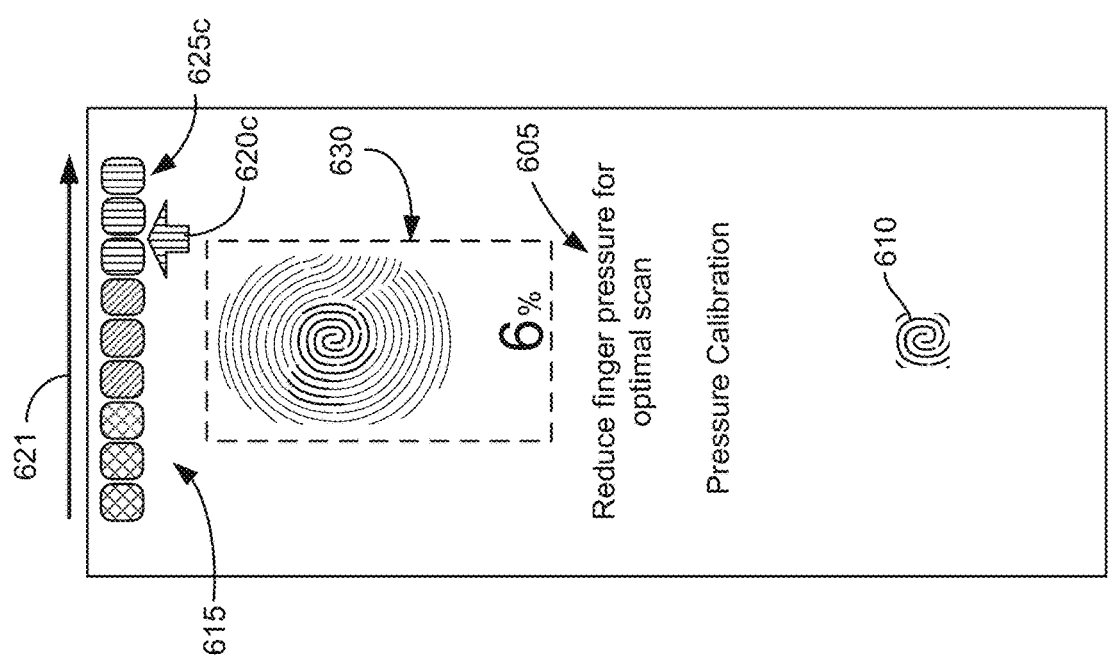

FIGS. 6A, 6B and 6C show examples of GUIs that may be presented during a pressure calibration phase of a user enrollment process. FIGS. 7A, 7B, 7C and 7D show examples of GUIs that may be presented during a fingerprint capture phase of a user enrollment process. As with other disclosed implementations, the types, numbers and arrangements of elements in the disclosed GUIs are merely made by way of example and are not intended to be limiting. Other GUI implementations that are within the scope of the present disclosure may have different types, numbers and/or arrangements of elements.

According to the examples shown in FIGS. 6A-6C, a control system is controlling a display system to present GUIs 600a, 600b and 600c, respectively, each of which includes a message area 605, a fingerprint sensor system area icon 610, a current digit pressure indicator 615 and an progress indicator 630. In these examples, the current digit pressure indicators 615 include the arrows 620a, 620b and 620c, as well as the elements 625a, 625b and 625c, respectively.

The GUI 600a of FIG. 6A is an example of a GUI that may be presented during block 509 if it is determined in block 507 that the digit pressure is not in an acceptable range. In this example, the message area 605 includes a prompt for the user to reduce the finger pressure being applied to the outer surface of the apparatus in an area corresponding to fingerprint sensor system area icon 610.

In the examples shown in FIGS. 6A-7D, the position of the arrows 620a, 620b, 620c, 720b, 720b, 720b, and 720b indicate a current finger pressure level. The arrow 621 shown in FIG. 6A (which would not necessarily be presented in the GUI 600a) points in the direction of increasing pressure. In FIG. 6A, the current digit pressure indicator 615 indicates that the current finger pressure is in a range that is unacceptably high: here, the arrow 620c is in a location corresponding to the elements 625c, which are in a high-pressure region of the current digit pressure indicator 615. In this example, the arrow 620c has a pattern corresponding to that of the elements 625c. In some examples, if the current digit pressure indicator 615 indicates that the current finger pressure is in a range that is unacceptably high, the arrow 620c and the elements 625c may be presented in a red color. In this instance, the progress indicator 630 shows that the pressure calibration phase is 6% complete.

The GUI 600b of FIG. 6B is another example of a GUI that may be presented during block 509 if it is determined in block 507 that the digit pressure is not in an acceptable range. In this example, the message area 605 includes a prompt for the user to increase the finger pressure being applied to the outer surface of the apparatus in an area corresponding to fingerprint sensor system area icon 610. The current digit pressure indicator 615 indicates that the current finger pressure is in a range that is unacceptably low: here, the arrow 620a is in a location corresponding to the elements 625a, which are in a low-pressure region of the current digit pressure indicator 615. Here, the arrow 620a has a pattern corresponding to that of the elements 625a. In some examples, if the current digit pressure indicator 615 indicates that the current finger pressure is in a range that is unacceptably low, the arrow 620a and the elements 625a may be presented in a yellow color.

The GUI 600bc of FIG. 6C is an example of a GUI that may be presented if it is determined in block 507 that the digit pressure is in an acceptable range. In this example, the message area 605 includes an encouraging message to the user, indicating that the finger pressure being applied to the outer surface of the apparatus in an area corresponding to fingerprint sensor system area icon 610 is in an optimal range. The current digit pressure indicator 615 indicates that the current finger pressure is in a range that is acceptable: here, the arrow 620b is in a location corresponding to the elements 625b, which are in a medium-pressure region of the current digit pressure indicator 615. Here, the arrow 620b has a pattern corresponding to that of the elements 625b. In some examples, if the current digit pressure indicator 615 indicates that the current finger pressure is in an acceptable range, the arrow 620b and the elements 625b may be presented in a green color.

Returning to FIG. 5, one example of the fingerprint capture phase 501b of the user enrollment process will now be described. In this example, block 511 involves obtaining data from a fingerprint sensor system while a digit is placed on a surface of an apparatus corresponding to an active area of the fingerprint sensor system. According to some examples, block 511 may involve obtaining data from an array of sensor pixels of an ultrasonic fingerprint sensor system, such as the array of sensor pixels 206 that are shown in FIG. 2. In some examples, block 511 may involve obtaining data from an electrode layer of an ultrasonic fingerprint sensor system, such as the electrode layer 210 that is shown in FIG. 2. Other examples may involve obtaining data from an array of sensor pixels of a different type of fingerprint sensor system, such as one of the alternative examples described above with reference to FIG. 1A.

According to this example, block 513 involves determining whether the current digit pressure (which may, for example, be estimated in block 511 or block 513) is within an acceptable range. Some implementations may involve determining a current digit force or pressure is within an acceptable image quality force range or an acceptable image quality pressure range that was previously determined during the pressure calibration phase and saved to a memory. As noted above, in some examples the acceptable image quality force range or acceptable image quality pressure range used for the evaluation process of block 513 may differ according to the particular individual, or even according to the particular digit, that is being enrolled.

According to this example, if it is determined in block 513 that the digit pressure is not in an acceptable range, method 500 continues to block 515, wherein the control system causes the apparatus 101 to provide a prompt (such as an audio prompt, a haptic feedback response and/or a visual prompt) indicating that the digit pressure is not in an acceptable range.

In some implementations (e.g., as described above with reference to FIGS. 4D and 6C), if it is determined in block 513 that the digit pressure is in an acceptable range, the control system may cause the apparatus to provide a prompt (such as an audio prompt and/or a visual prompt) indicating that the digit pressure is in an acceptable range.

According to this implementation, if it is determined in block 513 that the digit pressure is in an acceptable range, the process continues to block 517, in which it is determined whether the fingerprint capture phase 501b of the user enrollment process has been completed. In this example, if it is determined in block 517 that the fingerprint capture phase 501b of the user enrollment process has not been completed, the process reverts to block 511 and additional fingerprint image data is acquired. If it is determined in block 517 that the fingerprint capture phase 501b of the user enrollment process has been completed, the process continues to block 520, which corresponds to the end of the user enrollment process. In some examples, block 520 may involve providing a message (e.g., an audio message, a textual message, a video, etc.) indicating that the user enrollment process has completed successfully.

Figure 7A:
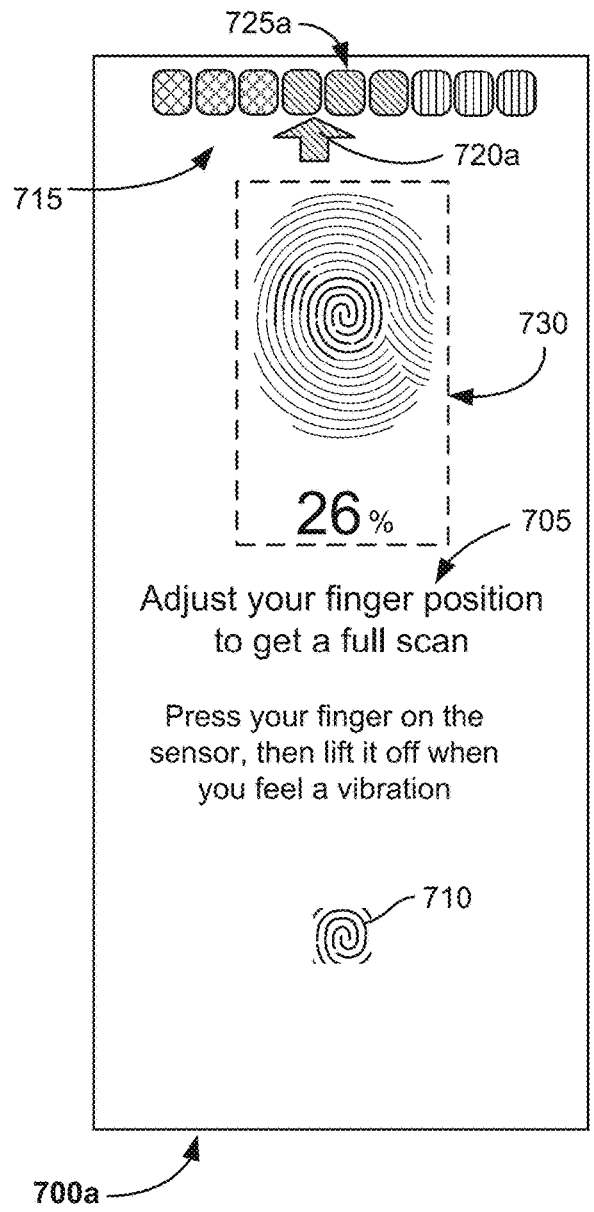
Figure 7B:
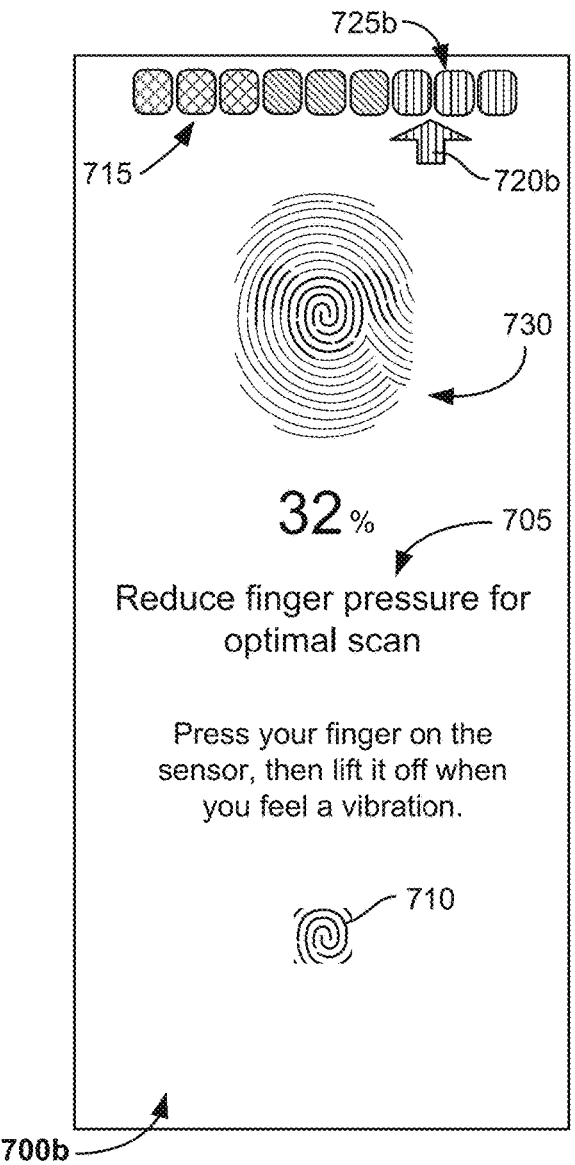

As noted above, FIGS. 7A-7D show examples of GUIs that may be presented during a fingerprint capture phase of a user enrollment process. According to the examples shown in FIGS. 7A-7D, a control system is controlling a display system to present GUIs 700a, 700b, 700c and 700d, respectively, each of which includes a message area 705, a current digit pressure indicator 715 and an progress indicator 730. FIGS. 7A-7C also include a fingerprint sensor system area icon 710.

The GUI 700a of FIG. 7A is an example of a GUI that may be presented if it is determined in block 513 that the digit pressure is in an acceptable range during a fingerprint capture phase, but that additional fingerprint image data needs to be acquired from other portions of the finger for which fingerprint image data is currently being captured. In this instance, the current digit pressure indicator 715 indicates that the current finger pressure is in a range that is acceptable: here, the arrow 720a is in a location corresponding to the elements 725a, which are in a medium-pressure region of the current digit pressure indicator 715.

In this example, the message area 705 includes a prompt for the user to adjust the finger position. In addition, the message area 705 includes a prompt for the user to press the finger to the outer surface of the apparatus in an area corresponding to fingerprint sensor system area icon 710, then to lift the finger off upon receiving haptic feedback, which is a vibration in this example. In this instance, the progress indicator 730 indicates that the fingerprint capture phase is 27% complete.

The GUI 700b of FIG. 7B is an example of a GUI that may be presented if it is determined in block 513 that the digit pressure is not in an acceptable range during a fingerprint capture phase of a user enrollment process. In this instance, the current digit pressure indicator 715 indicates that the current finger pressure is in a range that is too high: here, the arrow 720b is in a location corresponding to the elements 725b, which are in a high-pressure region of the current digit pressure indicator 715.

In this example, the message area 705 includes a prompt for the user to reduce the finger pressure. In addition, the message area 705 includes a prompt for the user to press the finger to the outer surface of the apparatus in an area corresponding to fingerprint sensor system area icon 710, then to lift the finger off upon perceiving a vibration. In this instance, the progress indicator 730 indicates that the fingerprint capture phase is 32% complete.

The GUI 700c of FIG. 7C is another example of a GUI that may be presented if it is determined in block 513 that the digit pressure is in an acceptable range during a fingerprint capture phase, but that additional fingerprint image data needs to be acquired from other portions of the finger for which fingerprint image data is currently being captured. In this instance, the current digit pressure indicator 715 indicates that the current finger pressure is in a range that is acceptable: here, the arrow 720c is in a location corresponding to the elements 725a, which are in a medium-pressure region of the current digit pressure indicator 715.

In this example, the message area 705 includes a prompt for the user to adjust the finger position in order to fully scan the finger for which fingerprint image data is currently being captured. In addition, the message area 705 includes a prompt for the user to press the finger to the outer surface of the apparatus in an area corresponding to fingerprint sensor system area icon 710, then to lift the finger off upon receiving haptic feedback, which is a vibration in this example. In this instance, the progress indicator 730 indicates that the fingerprint capture phase is 32% complete.

The GUI 700d of FIG. 7D is an example of a GUI that may be presented if it is determined in block 517 of FIG. 5 that the fingerprint capture phase of a user enrollment process has successfully completed. The GUI 700d may, for example, be presented in block 520. In this instance, the progress indicator 730 indicates that the fingerprint capture phase is 100% complete. According to this example, the current digit pressure indicator 715 is still providing user feedback and indicates that the current finger pressure is in a range that is acceptable.

Figure 7E:
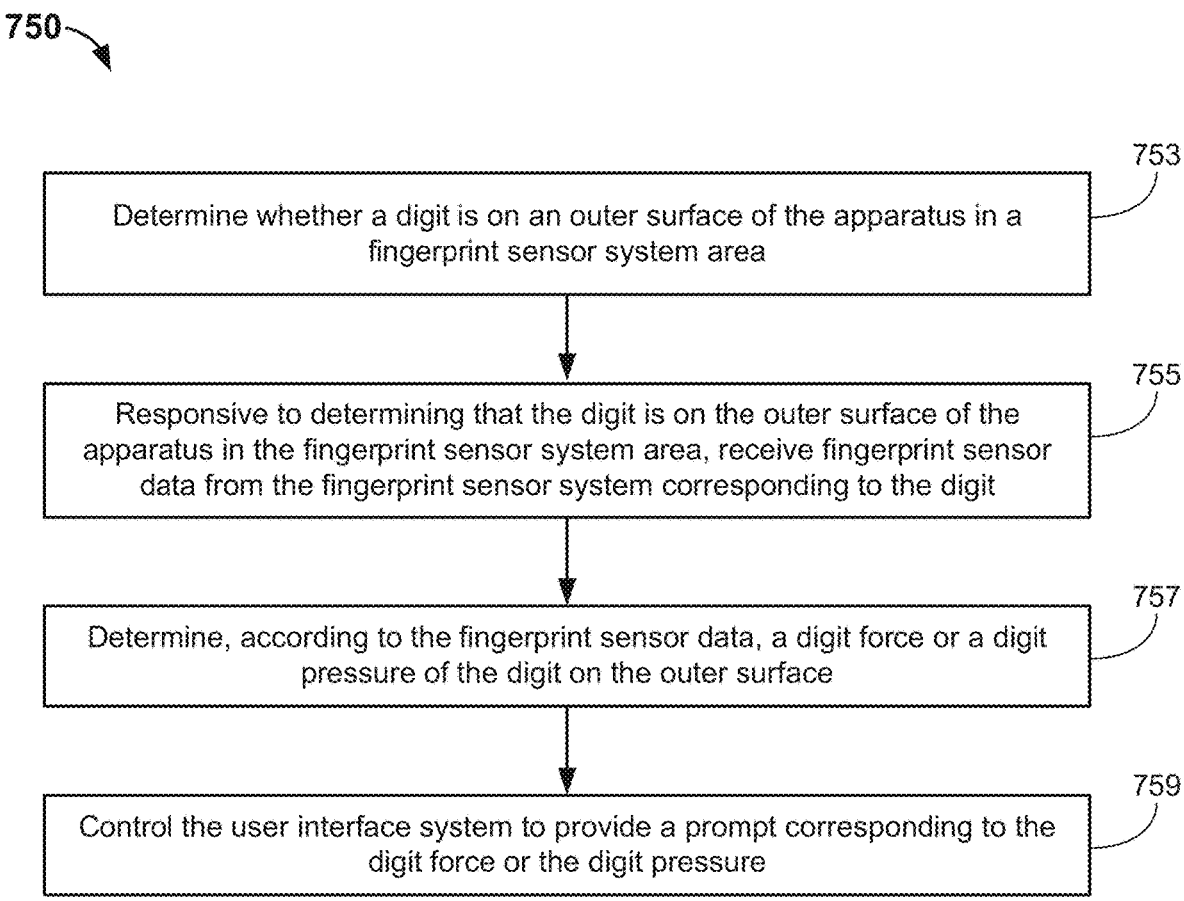
FIG. 7E is a flow diagram that provides example blocks of some alternative methods disclosed herein.

FIG. 7E is a flow diagram that provides example blocks of some alternative methods disclosed herein. The blocks of FIG. 7E may, for example, be performed by the apparatus 101 of FIG. 1A, FIG. 1B or FIG. 2, or by a similar apparatus. As with other methods disclosed herein, the method 750 outlined in FIG. 7E may include more or fewer blocks than indicated. Moreover, the blocks of methods disclosed herein are not necessarily performed in the order indicated. In some examples, some blocks of methods disclosed herein may be performed concurrently.

According to this example, the method 750 is a method of controlling an apparatus that includes a fingerprint sensor, which may or may not be an ultrasonic fingerprint sensor depending on the particular implementation. According to this implementation, block 753 involves determining, via a control system of the apparatus (such as the control system 106 of the apparatus 101), whether a digit is on an outer surface of the apparatus in a fingerprint sensor system area. In some examples, the apparatus may include a touch sensor system and block 753 may involve receiving input from the touch sensor system indicating whether a target object is on an outer surface of the apparatus in an active area of a fingerprint sensor system. In some examples, block 753 may involve receiving input from the touch sensor system and/or the fingerprint sensor system indicating whether a target object on the outer surface of the apparatus in an active area of a fingerprint sensor system has one or more characteristics of a finger, such as a finger shape, fingerprint features, etc. In some examples, block 753 may involve receiving input from the fingerprint sensor system indicating whether a target object on the outer surface of the apparatus in an active area of a fingerprint sensor system has one or more sub-epidermal features such as papillary layer features, reticular layer features, subcutis features, blood vessel features, lymph vessel features, fat lobule features, muscle tissue features, bone features, etc.

In this example, in block 755, responsive to determining (in block 753) that a digit is on the outer surface of the apparatus in the fingerprint sensor system area, receiving fingerprint sensor data from the fingerprint sensor system corresponding to the digit. As noted above, in some instances block 753 also may involve receiving fingerprint sensor data from a target object in the process of determining whether the target object is a digit. According to some such examples, no additional fingerprint sensor data will be obtained in block 755. However, in some such instances additional fingerprint sensor data may be obtained in block 755. For example, in some instances block 753 may involve receiving fingerprint sensor data from an electrode layer, such as the electrode layer 210 of FIG. 2, whereas block 755 may involve receiving fingerprint sensor data from an array of sensor pixels, such as the array of sensor pixels 206 of FIG. 2.

According to this example, block 757 involves determining, via the control system, a digit force or a digit pressure of the digit on the outer surface of the apparatus. In some examples, the control system may determine the digit force or the digit pressure according to fingerprint sensor data received from the fingerprint sensor system. According to some such examples, the fingerprint sensor data may be, or may include, ultrasonic fingerprint sensor data. In some such examples, the ultrasonic fingerprint sensor data may be received via an electrode layer proximate a piezoelectric layer of an ultrasonic fingerprint sensor system. Alternatively, or additionally, in some examples the ultrasonic fingerprint sensor data may be received via an array of ultrasonic sensor pixels. Some detailed examples for estimating digit force or digit pressure according to fingerprint sensor data are described below with reference to FIG. 8A et seq. However, in some implementations block 757 may involve determining a digit force or a digit pressure according to force sensor data from a force sensor (such as the optional force sensor 110 of FIG. 1A or FIG. 1B) that is separate from the fingerprint sensor system 102.

According to this example, block 759 involves controlling, via the control system, a user interface system of the apparatus to provide a prompt corresponding to the digit force or the digit pressure. In some examples, the prompt may be, or may include, an audio prompt made via a loudspeaker system of the apparatus 101 and/or haptic feedback from a haptic feedback system of the apparatus 101. Alternatively, or additionally, in some examples the prompt may include a visual prompt made via a display system.

For example, providing the prompt may involve presenting a GUI on a display device of the apparatus. The GUI may, for example, indicate a current digit force or a current digit pressure. The GUI may, in some instances, indicate whether the current digit force or the current digit pressure is within an acceptable range, e.g., as in the examples described above with reference to one of FIG. 4D, 6C, 7A, 7C or 7D. However, in some instances, the GUI may indicate that the current digit force or the current digit pressure is not within an acceptable range, e.g., as in the examples described above with reference to one of FIG. 4B, 4C, 6A, 6B or 7B. According to some such examples, the GUI may include a prompt to change the current digit force or the current digit pressure.

In some examples, the prompt referenced in FIG. 7E may be presented during a user enrollment process. According to some such examples, the prompt may correspond with a force calibration phase or a pressure calibration phase of a user enrollment process. In some examples, the prompt may correspond with a fingerprint capture phase of a user enrollment process. However, in some examples the prompt may be presented after an enrollment process, e.g., as part of an authentication process.

In some implementations, method 750 may involve obtaining fingerprint image data based on signals received from the fingerprint sensor system 102. Some implementations of method 750 may involve determining an image quality metric corresponding to the fingerprint image data, e.g., as described above with reference to FIG. 3. According to some examples, the prompt of method 750 may be based, at least in part, on the image quality metric. In some such examples, the second prompt may indicate whether a current digit force or a current digit pressure should be changed.

In some implementations, method 750 may involve controlling, via the control system, the apparatus to provide a second prompt based, at least in part, on the image quality metric. The second prompt may, for example, indicate that a finger moisture level should be changed. For example, the second prompt may be, or may include, a text on a GUI prompting a user to apply moisturizer to the finger.

In some implementations, other types of digit characteristics may be determined and stored during an enrollment process, in addition to fingerprint image characteristic data (e.g., in addition to identifying and storing fingerprint features such as fingerprint ridge endings, fingerprint ridge bifurcations, short ridges and/or islands, and the locations of such fingerprint features). Such other digit characteristics may be determined and stored as digit characteristic data. The digit characteristic data may, for example, include digit orientation data, digit force data, digit pressure data or digit dryness data.

According to some such examples, a subsequent authentication process may be based, at least in part, on one or more types of digit characteristic data. If it is determined during the authentication process that a currently-determined digit characteristic does not match a digit characteristic that was determined during an enrollment process, this may be an indication of a spoof attempt. In some implementations, this condition may trigger a more rigorous authentication procedure.

Figure 8A:
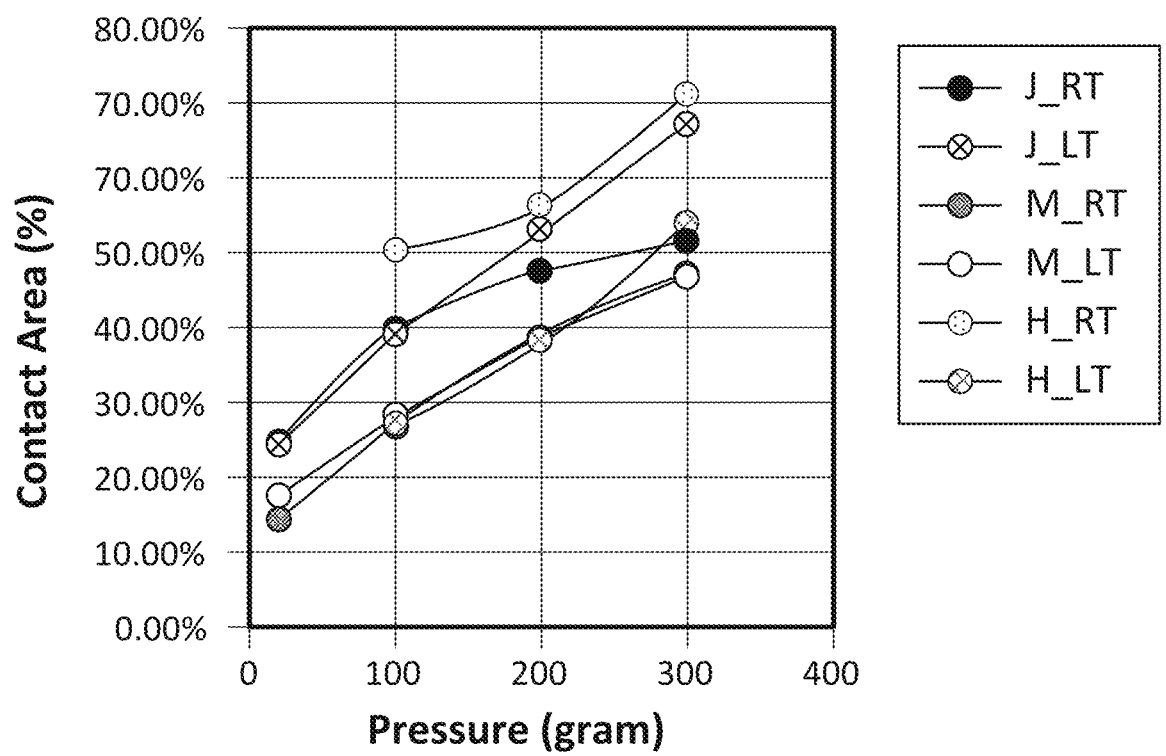
FIGS. 8A, 8B and 8C show examples of graphs that indicate changes in fingerprint images according to changes in applied finger pressure.
Figure 8B:
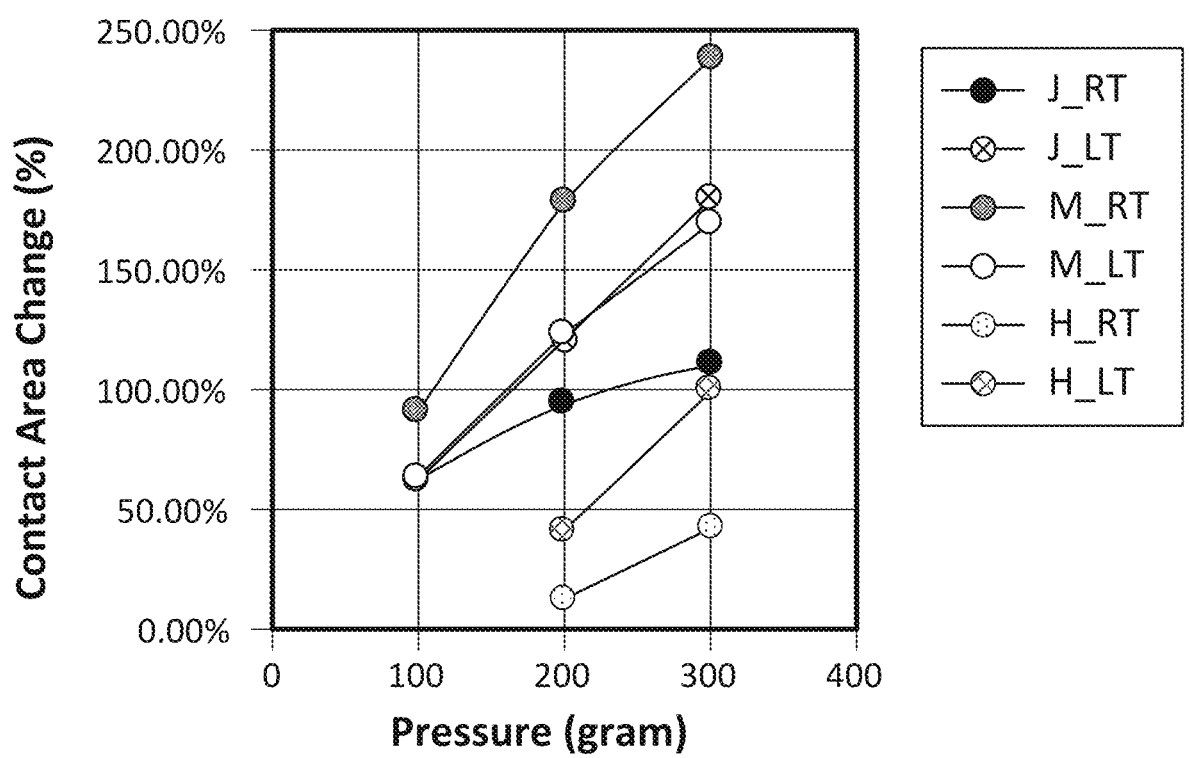
Figure 8C:
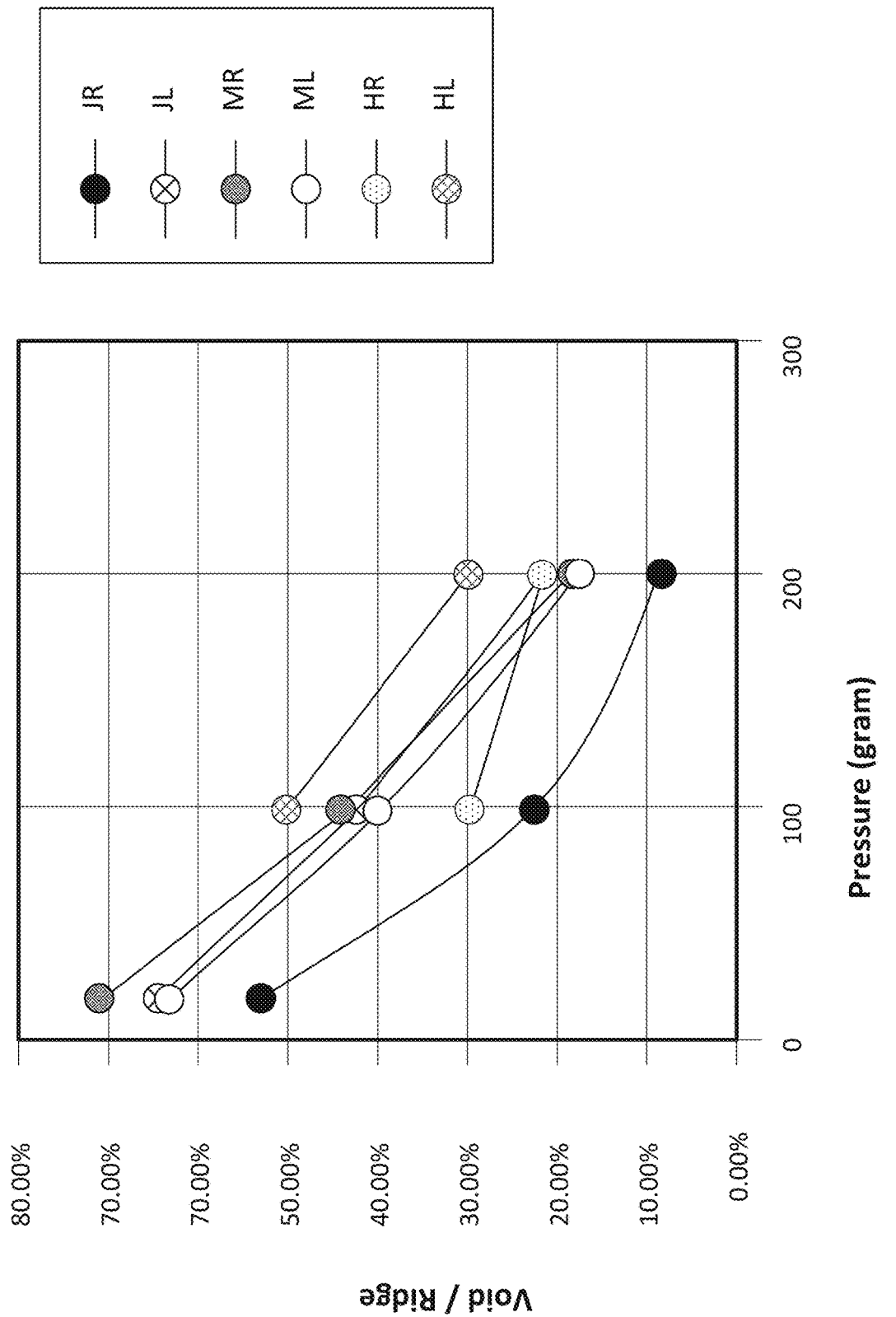

FIGS. 8A, 8B and 8C show examples of graphs that indicate changes in fingerprint images according to changes in applied finger pressure. FIG. 8A shows examples of how the contact area of various fingers changed according to increased pressure. The curves in FIG. 8A correspond to the left and right thumbs (LT and RT) of three different individuals (J, M and H). In these examples, J_RT and J_LT correspond to normal fingers, M_RT and M_LT correspond to worn fingers, and H_RT and H_LT correspond to dry fingers. It may be seen in FIG. 8A that the contact area generally increased with increased pressure, as described above. However, each finger responded to the increased pressure in a different manner. It may be seen in FIG. 8A, for example, that the contact areas of these digits vary substantially at the same pressure levels. For example, the H_RT curve indicates a contact area slightly above 50% at an applied pressure of 100 grams, whereas the contact areas of the curves M_RT, M_LT and H_LT indicate contact areas slightly below 30% at an applied pressure of 100 grams.

It also may be seen in FIG. 8A, that the slopes of the H_RT curve and the H_LT curve increased as the pressure increased from 200 to 300 grams. Both of these curves are concave upwards. In contrast, the slope of the J_LT curve was generally constant in a pressure range from 10 to 300 grams. The slope of the J_RT curve changed significantly in this pressure range, producing a concave downwards curve. The curves shown in FIG. 8B show the above-described contact area changes as a function of pressure. As shown in FIGS. 8A and 8B, these changes are characteristic to particular digits and can change significantly between individuals and also between digits of the same individual.

FIG. 8C shows examples of how the void-to-ridge ratio of fingerprint images changes as a function of applied pressure. A fingerprint "void" is also referred to herein as a fingerprint valley. The curves in FIG. 8C correspond to the left and right thumbs (L and R) of the individuals J, M and H. The values shown in FIG. 8C, as well as the slope changes, are characteristic to particular digits. Both the values and the slopes can change significantly between individuals and between digits of the same individual.

According to some examples, the anti-spoofing process may involve a process of estimating a target object material property. In some such examples, the material property of the target object may be based on the slope of one of more of the graphs shown in FIGS. 8A, 8B and 8C. For example, the slope in FIG. 8A indicates how much a finger deforms when an applied force is increased. The stiffer the finger is, the smaller the deformation is. Normally, there is a positive correlation between stiffness and the dryness of a finger. By tracking this information, further we can derive the material properties, such as Young's modulus and Poisson's ratio. With the same nominal force, the change of contact area indicates the strain on the skin. The strain-stress ratio can be calculated to indicate the relative value of Young's modulus. The ratio of transverse strain (which can be estimated by the contact area change) and the axial strain (which can be estimated by the depth information extracted from a subdermal scan) is used to obtain Poisson's ratio.

Figure 9:
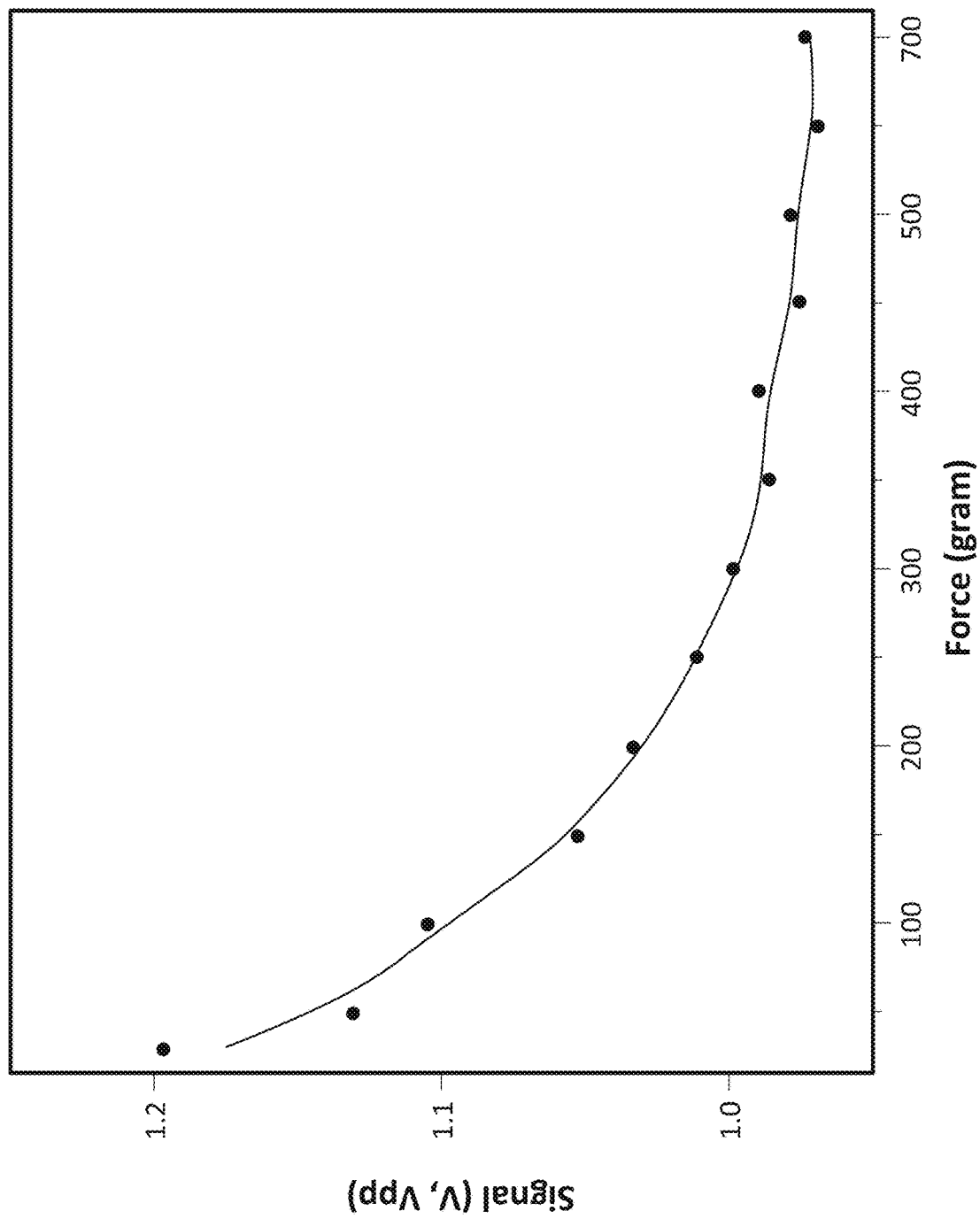
FIG. 9 is a graph that shows changes in received signal strength according to changes in the force applied to a finger on an ultrasonic sensor according to some examples.

FIG. 9 is a graph that shows changes in received signal strength according to changes in the force applied to a finger on an ultrasonic sensor according to some examples. In the examples depicted in FIG. 9, the ultrasonic sensor system used for the scans was of the general type shown in FIG. 2. Accordingly, in this example the ultrasonic sensor system 102 included a piezoelectric layer 208, an electrode layer 210 on one side of the piezoelectric layer 208 and an array of sensor pixels 206 on a second and opposing side of the piezoelectric layer 208. In these examples, the ultrasonic signals corresponding to the ultrasonic scans were obtained via "direct sampling": instead of reading out the signal from each individual sensor pixel of the array of sensor pixels 206, the reflected ultrasonic waves were received via the electrode layer 210. In the example shown in FIG. 9, the horizontal axis indicates force in gram-force units and the vertical axis indicates signal strength, with "V" representing voltage and "Vpp" representing peak-to-peak voltage. Each data point shown in FIG. 9 corresponds to an average values from 6 independent tests. The signal strength shown in FIG. 9 indicates the signal reflection from the finger/platen interface. The larger the contact force, the larger the contact area corresponding to fingerprint ridges and therefore the smaller returning signal from the finger/platen interface.

Figure 10:
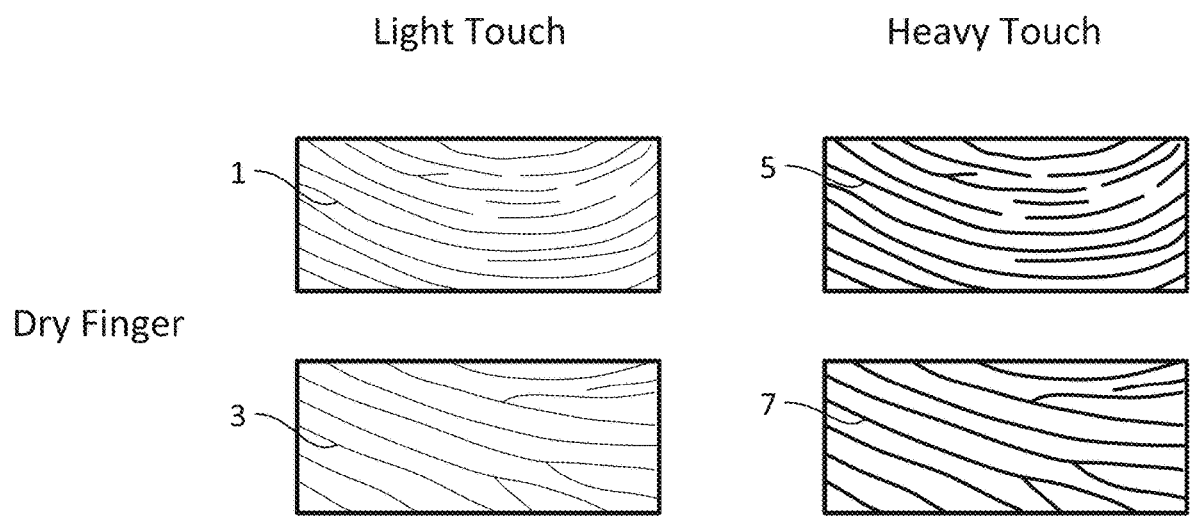
FIG. 10 shows examples of fingerprint images obtained from a dry finger by an ultrasonic fingerprint sensor.

FIG. 10 shows examples of fingerprint images obtained from a dry finger by an ultrasonic fingerprint sensor. In these examples, image 1 and image 5 are from the same portion of the finger. Image 3 and image 7 both correspond to another portion of the finger. Images 1 and 3 were obtained when the finger was lightly touching the surface of the ultrasonic fingerprint sensor, whereas images 5 and 7 were obtained when the finger was pressed against the surface of the ultrasonic fingerprint sensor with a relatively larger force. In these examples, the light touches correspond to approximately 30 gram-force and the heavier touches correspond to 100 gram-force or more.

Figure 11:
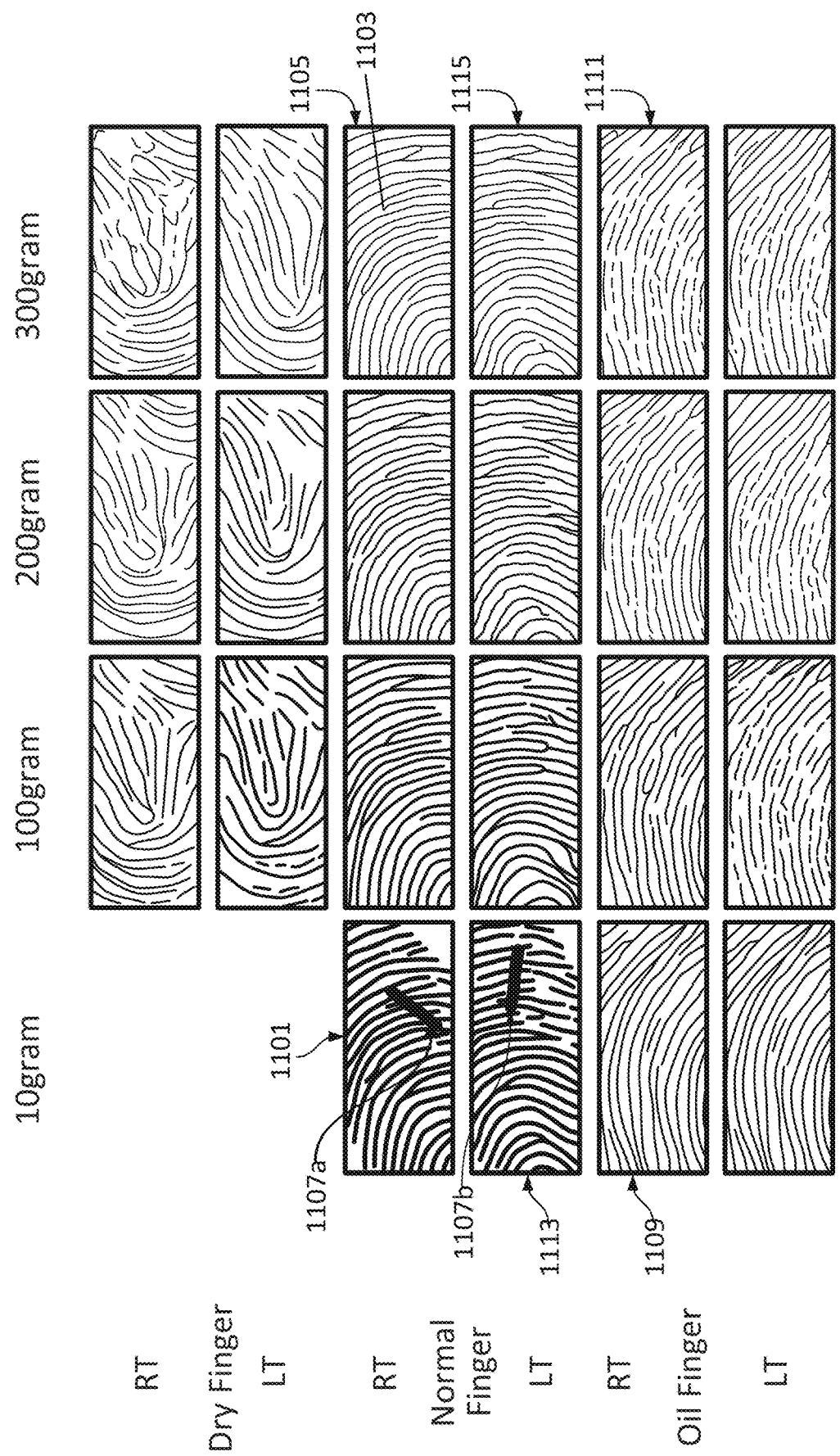
FIG. 11 shows examples of fingerprint images and corresponding forces.

FIG. 11 shows examples of fingerprint images and corresponding forces. The indicated forces are in gram-force units. Despite the fact that grams are actually units of mass, not force, the discussion in this disclosure may refer to forces or pressures as being in "grams" for convenience and economy of language. In FIG. 11, "RT" means right thumb and "LT" means left thumb.

In FIG. 11, the relatively darker portions of the images correspond to areas with relatively higher-amplitude reflections. As noted above, the relatively higher-amplitude reflections will generally correspond to air/platen or, more generally, air/outer surface interfaces, which will occur when a fingerprint valley is adjacent the outer surface. The relatively higher-amplitude reflections occur because the air/outer surface interfaces have higher acoustic impedance contrasts than the skin/outer surface interfaces that will be created when a fingerprint ridge is in contact with the outer surface.

One may see that the image 1101 has a much higher percentage of dark regions than image 1105. This is because image 1101 was obtained when a normal right thumb was pressing on the outer surface with a force of 10 grams, whereas image 1105 was obtained when a normal right thumb was pressing on the outer surface with a force of 300 grams. In the latter case, the fingerprint ridges are responding to the applied force by appearing to spread out laterally, in part because portions of the fingerprint ridges that were not contacting the surface when a lower force was applied are now being pressed against the surface. The result is that the image 1105 was obtained when a relatively higher percentage of the image corresponded to fingerprint ridge/outer surface interfaces, which correspond to the lighter regions of image 1105.

The above-described effect may not be as pronounced for oily fingers. For example, referring to the right thumb "oil finger" example of FIG. 11, one may observe that while image 1109 has a slightly higher percentage of dark areas as compared to image 1111, the difference is not nearly as great as the difference between image 1101 and image 1105.

As shown in FIG. 11, some fingerprint image features may be clearer when a larger force is being applied. For example, the termination 1103 is more clearly shown in image 1105 than in image 1101.

However, other fingerprint image features may be clearer when a smaller force is being applied. For example, the fold 1107a is prominent in image 1101, but is not prominent in image 1105. Similarly, the fold 1107b is readily observable in image 1113, but is not prominent in image 1115.

According to some disclosed implementations, an anti-spoofing process may be based on one or more of the features, or other aspects, of a fingerprint image that change according to pressure. In some such implementations, a fingerprint enrollment process may involve obtaining ultrasonic fingerprint image data for the same portion of a finger at multiple different applied forces. For example, after obtaining a first set of ultrasonic fingerprint image data at a first measured (or estimated) force from a portion of a user's finger, the user could be prompted (e.g., via text and/or an image provided on a display and/or via an audio prompt provided via a speaker) to press down the same portion of the finger more firmly against an outer surface of an ultrasonic fingerprint sensor surface (or a surface of a device proximate an area in which the ultrasonic fingerprint sensor resides). A second applied force could be measured (or estimated) and a second set of ultrasonic fingerprint image data could be obtained from the same portion of the user's finger. In some instances, the process could be repeated in order to obtain third, fourth and/or fifth sets of ultrasonic fingerprint image data when the finger is being pressed against the outer surface with third, fourth and/or fifth measured or estimated forces. According to some implementations, the process could be repeated for multiple digits of the user during the enrollment process.

As described above with reference to FIG. 11, an enrollment process that involves obtaining fingerprint image data when two or more different forces are being applied may reveal characteristics of a finger that would be difficult to spoof. For example, if a hacker were in possession of an image like that of image 1105, the hacker would not be able to successfully represent the fold 1107a shown in image 1101. Similarly, if a hacker were in possession of the image 1115, the hacker would not be able to successfully represent the fold 1107b shown in image 1113.

During a "run time" operation after successful completion of the enrollment process, an anti-spoofing process may be based, at least in part, on data obtained during the enrollment process. In some instances, the anti-spoofing process may also be based, at least in part, on a first fingerprint image of a target object corresponding to first ultrasonic receiver signals and/or a second fingerprint image of the target object corresponding to second ultrasonic receiver signals. Some anti-spoofing processes may involve obtaining a third fingerprint image of the target object corresponding to third ultrasonic receiver signals. In some instances, the target object may be a finger. In some implementations, the anti-spoofing process may be based, at least in part, on measured or estimated forces of the finger against the outer surface at the times that the ultrasonic receiver signals are obtained.

For example, some examples of method 300 and/or method 750 may involve measuring and/or estimating a first force corresponding to the first ultrasonic receiver signals and measuring and/or estimating a second force corresponding to the second ultrasonic receiver signals. In some such examples, method 300 and/or method 750 may involve controlling a display and/or a speaker to provide a prompt to apply a different force after measuring and/or estimating the first force.

Figure 12:
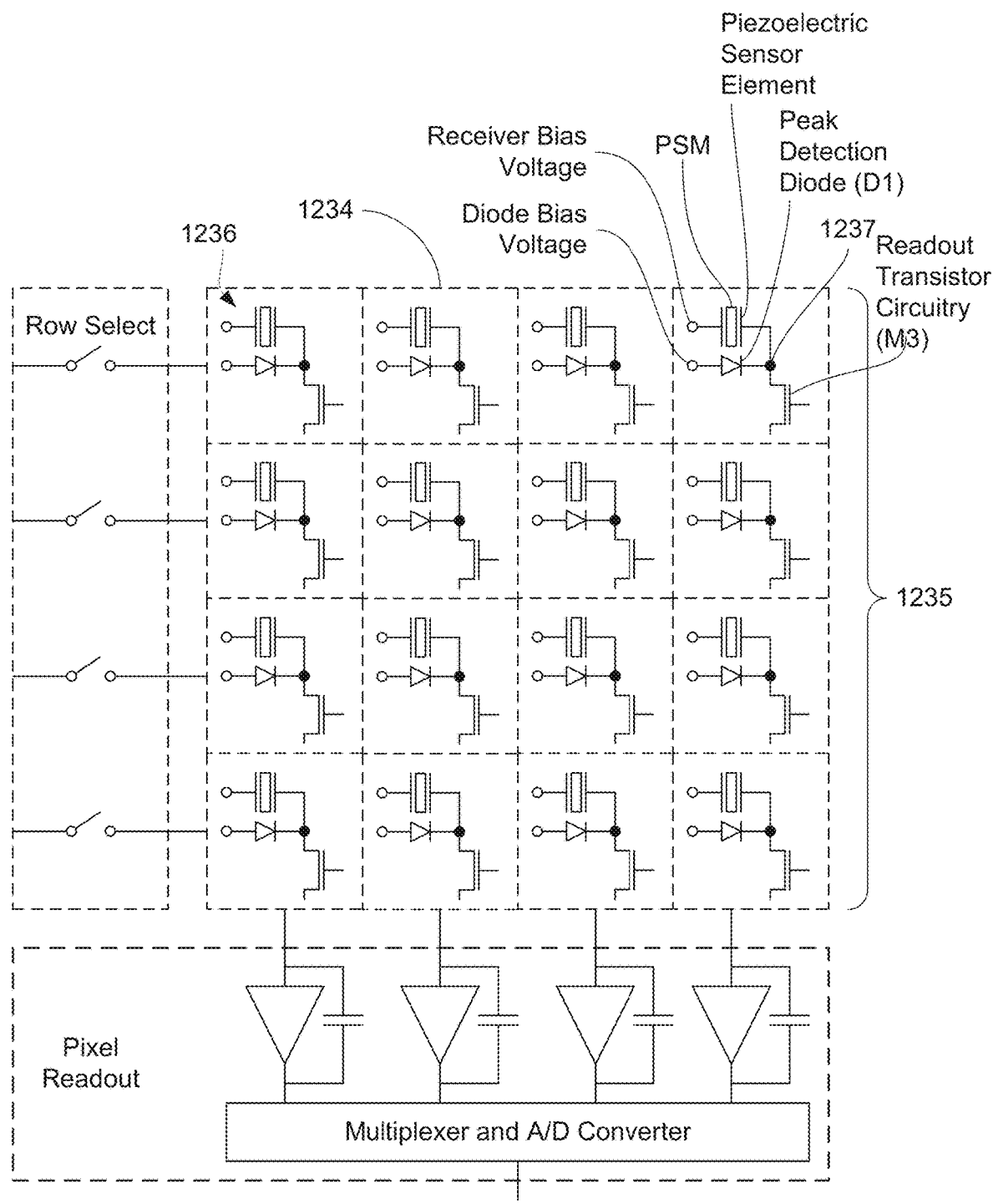
FIG. 12 representationally depicts aspects of a 4×4 pixel array of sensor pixels for an ultrasonic fingerprint sensor.

FIG. 12 representationally depicts aspects of a 4×4 pixel array of sensor pixels for an ultrasonic fingerprint sensor. Each sensor pixel 1234 may be, for example, associated with a local region of piezoelectric sensor material (PSM), a pixel input electrode 1237, a peak detection diode (D1) and a readout transistor circuitry (M3); many or all of these elements may be formed on or in a substrate to form the pixel circuit 1236. In practice, the local region of piezoelectric sensor material of each sensor pixel 1234 may transduce received ultrasonic energy into electrical charges. The peak detection diode D1 may register the maximum amount of charge detected by the local region of piezoelectric sensor material PSM. Each row of the pixel array 1235 may then be scanned, e.g., through a row select mechanism, a gate driver, or a shift register, and the readout transistor circuitry M3 for each column may be triggered to allow the magnitude of the peak charge for each sensor pixel 1234 to be read by additional circuitry, e.g., a multiplexer and an A/D converter. The pixel circuit 1236 may include one or more TFTs to allow gating, addressing, and resetting of the sensor pixel 1234.

Each pixel circuit 1236 may provide information about a small portion of the object detected by the ultrasonic fingerprint sensor. While, for convenience of illustration, the example shown in FIG. 12 is of a relatively coarse resolution, ultrasonic sensors having a resolution on the order of 500 pixels per inch or higher may be configured with an appropriately scaled structure. The detection area of the ultrasonic fingerprint sensor may be selected depending on the intended object of detection. For example, the detection area may range from about 8 mm×3 mm, 5 mm×5 mm or 9 mm×4 mm for a single finger to about 3 inches×3 inches for four fingers. Smaller and larger areas, including square, rectangular and non-rectangular geometries, may be used as appropriate for the target object.

Figure 13A:
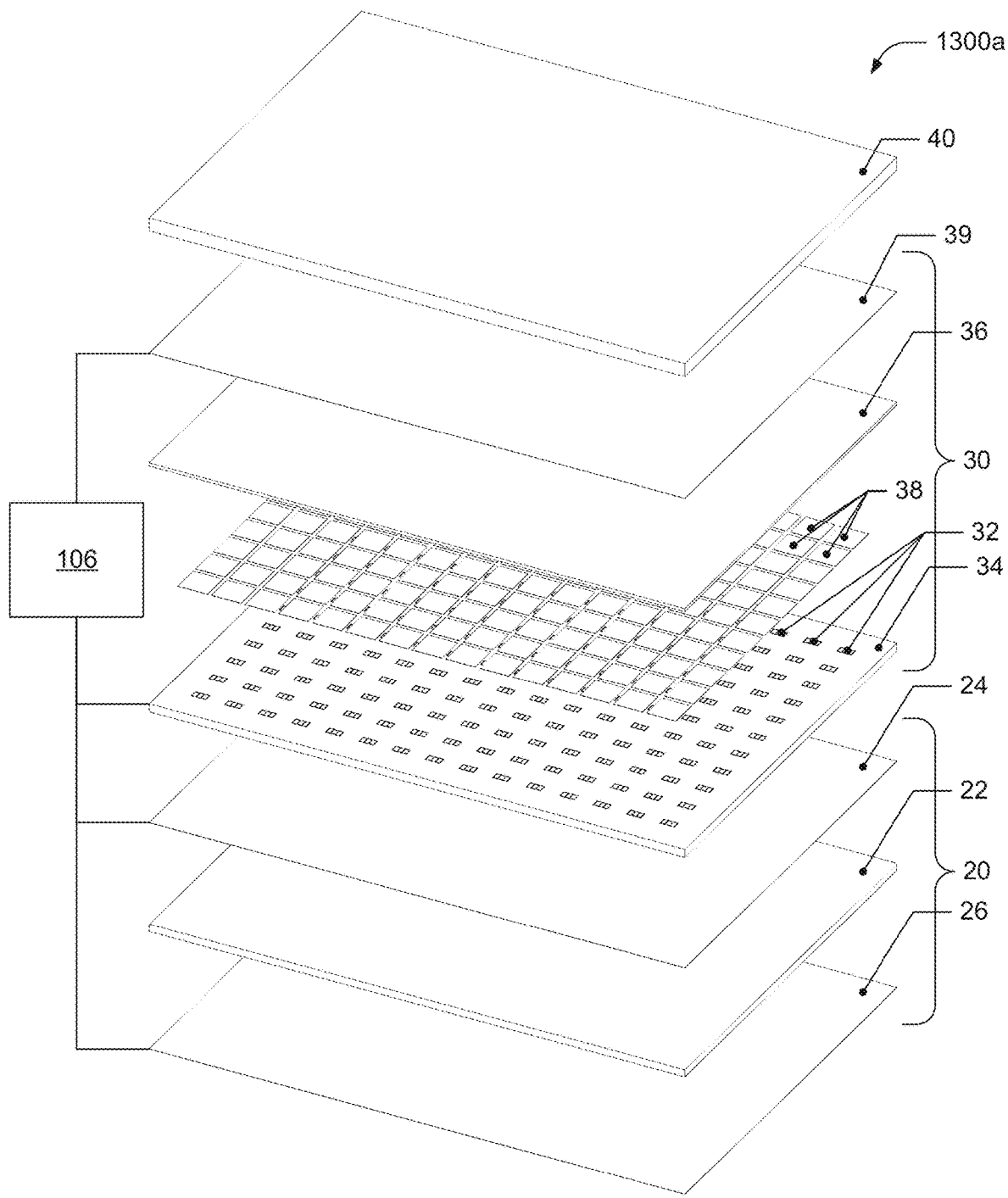
FIGS. 13A and 13B show example arrangements of ultrasonic transmitters and receivers in an ultrasonic fingerprint sensor, with other arrangements being possible.

FIG. 13A shows an example of an exploded view of an ultrasonic fingerprint sensor. In this example, the ultrasonic fingerprint sensor 1300a includes an ultrasonic transmitter 20 and an ultrasonic receiver 30 under a platen 40. According to some implementations, the ultrasonic receiver 30 may be an example of the ultrasonic receiver 103 that is shown in FIG. 1B and described above. In some implementations, the ultrasonic transmitter 20 may be an example of the ultrasonic transmitter 105 that is shown in FIG. 1B and described above. The ultrasonic transmitter 20 may include a substantially planar piezoelectric transmitter layer 22 and may be configured for functioning as a plane wave generator. Ultrasonic waves may be generated by applying a voltage to the piezoelectric layer to expand or contract the layer, depending upon the signal applied, thereby generating a plane wave. In this example, the control system 106 may be configured for causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This generated ultrasonic wave may travel towards a finger (or other object to be detected), passing through the platen 40. A portion of the wave not absorbed or transmitted by the object to be detected may be reflected so as to pass back through the platen 40 and be received by the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may be configured to convert surface charge generated by the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into surface charge by the piezoelectric receiver layer 36. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 106 may operate substantially as described above. For example, the control system 106 may be configured for processing the amplified signals received from the sensor pixel circuits 32.

The control system 106 may be configured for controlling the ultrasonic transmitter 20 and/or the ultrasonic receiver 30 to obtain ultrasonic data, which may include fingerprint data. According to some implementations, the control system 106 may be configured for providing functionality such as that described herein.

Whether or not the ultrasonic fingerprint sensor 1300a includes a separate ultrasonic transmitter 20, in some implementations the control system 106 may be configured for obtaining attribute information from the ultrasonic data. In some examples, the control system 106 may be configured for controlling access to one or more devices based, at least in part, on the attribute information. The ultrasonic fingerprint sensor 1300a (or an associated device) may include a memory system that includes one or more memory devices. In some implementations, the control system 106 may include at least a portion of the memory system. The control system 106 may be configured for obtaining attribute information from ultrasonic data and storing the attribute information in the memory system. In some implementations, the control system 106 may be configured for capturing a fingerprint image, obtaining attribute information from the fingerprint image and storing attribute information obtained from the fingerprint image (which may be referred to herein as fingerprint image information or fingerprint image data) in the memory system. According to some examples, the control system 106 may be configured for capturing a fingerprint image, obtaining attribute information from the fingerprint image and storing attribute information obtained from the fingerprint image even while maintaining the ultrasonic transmitter 20 in an "off" state.

In some implementations, the control system 106 may be configured for operating the ultrasonic fingerprint sensor 1300a in an ultrasonic imaging mode or a force-sensing mode. In some implementations, the control system may be configured for maintaining the ultrasonic transmitter 20 in an "off" state when operating the ultrasonic fingerprint sensor in a force-sensing mode. The ultrasonic receiver 30 may be configured for functioning as a force sensor when the ultrasonic fingerprint sensor 1300a is operating in the force-sensing mode. In some implementations, the control system 106 may be configured for controlling other devices, such as a display system, a communication system, etc. In some implementations, the control system 106 may be configured for operating the ultrasonic fingerprint sensor 1300a in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is configured for imaging fingerprints in a force detection mode or a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 μm thick and a PVDF-TrFE receiver layer 36 is approximately 12 μm thick. Example frequencies of the ultrasonic waves may be in the range of 1 MHz to 20 MHz, with wavelengths on the order of a millimeter or less.

Figure 13B:
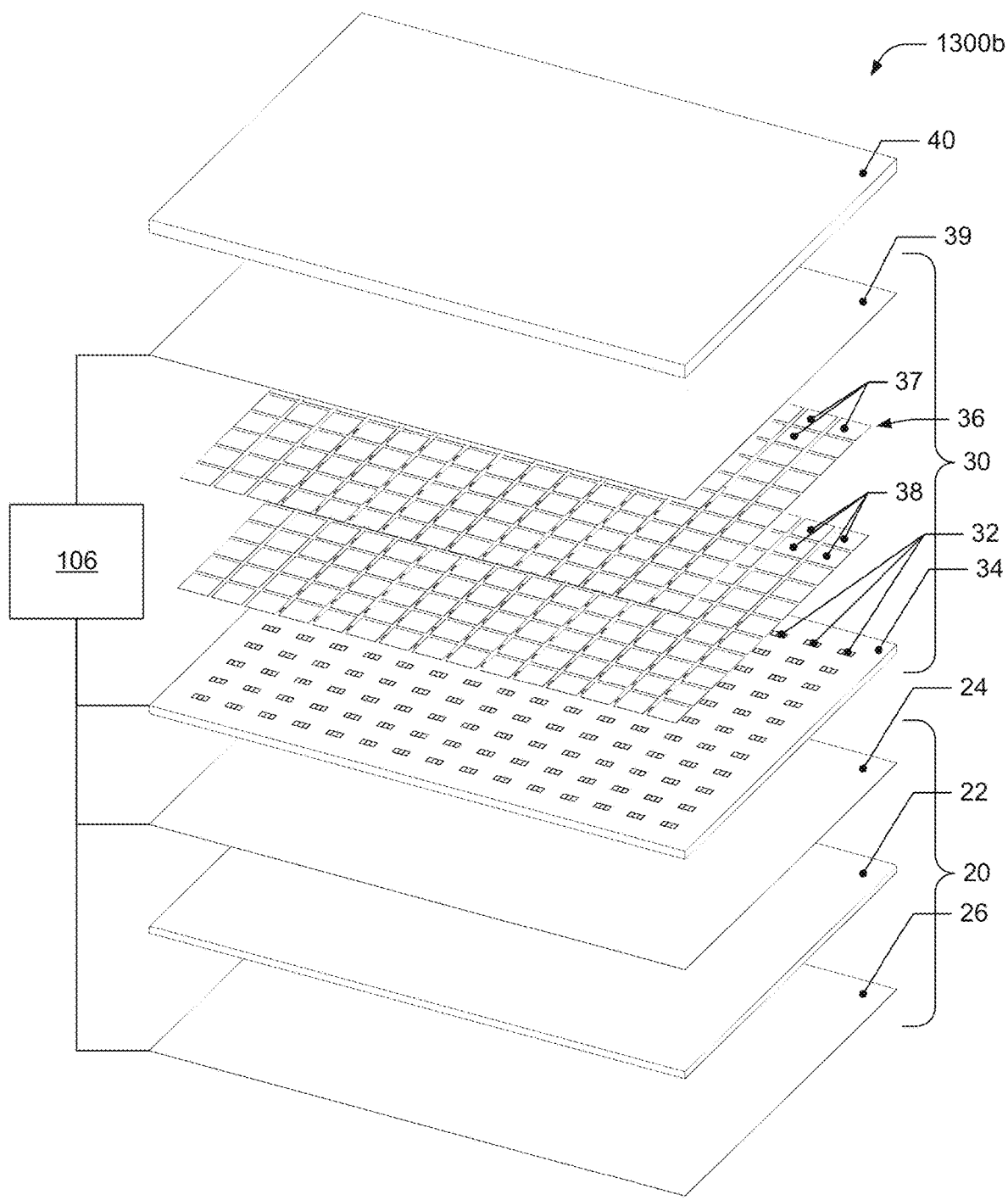

FIG. 13B shows an exploded view of an alternative example of an ultrasonic fingerprint sensor. In this example, the piezoelectric receiver layer 36 has been formed into discrete elements 37. In the implementation shown in FIG. 13B, each of the discrete elements 37 corresponds with a single pixel input electrode 38 and a single sensor pixel circuit 32. However, in alternative implementations of the ultrasonic fingerprint sensor 1300b, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 13A and 13B show example arrangements of ultrasonic transmitters and receivers in an ultrasonic fingerprint sensor, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic fingerprint sensor may include an acoustic delay layer. For example, an acoustic delay layer may be incorporated into the ultrasonic fingerprint sensor between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic fingerprint sensor is arriving at the ultrasonic receiver 30. In some implementations, the substrate 34 and/or the platen 40 may serve, as an acoustic delay layer.

Figure 13C:
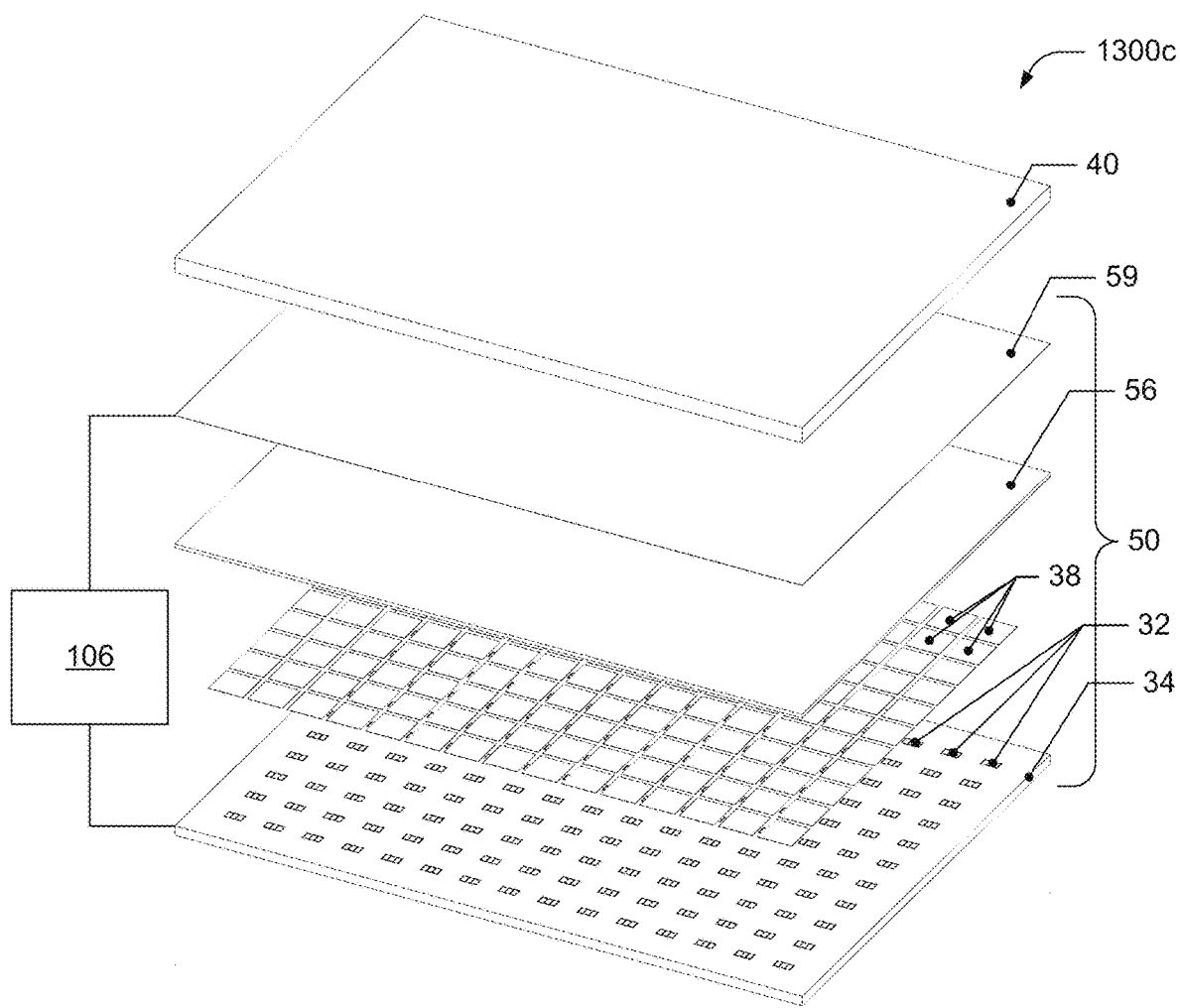
FIG. 13C shows an exploded view of an example of an ultrasonic fingerprint sensor.

FIG. 13C shows an exploded view of an example of an ultrasonic fingerprint sensor. In this example, the ultrasonic fingerprint sensor 1300c includes an ultrasonic transceiver array 50 under a platen 40. According to some implementations, the ultrasonic transceiver array 50 may serve as both the ultrasonic receiver 103 and the ultrasonic transmitter 105 that is shown in FIG. 1B and described above. The ultrasonic transceiver array 50 may include a substantially planar piezoelectric transceiver layer 56 configured for functioning as a plane wave generator. Ultrasonic waves may be generated by applying a voltage across the transceiver layer 56. The control system 106 may be configured for generating a transceiver excitation voltage that may be applied to the piezoelectric transceiver layer 56 via one or more underlying pixel input electrodes 38 or one or more overlying transceiver bias electrodes 59. The generated ultrasonic wave may travel towards a finger or other object to be detected, passing through the platen 40. A portion of the wave not absorbed or transmitted by the object may be reflected so as to pass back through the platen 40 and be received by the ultrasonic transceiver array 50.

The ultrasonic transceiver array 50 may include an array of sensor pixel circuits 32 disposed on a substrate 34. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may include a pixel input electrode 38 that electrically couples the piezoelectric transceiver layer 56 to the sensor pixel circuit 32.

In the illustrated implementation, the transceiver bias electrode 59 is disposed on a side of the piezoelectric transceiver layer 56 proximal to the platen 40. The transceiver bias electrode 59 may be a metallized electrode and may be grounded or biased to control which signals may be generated and which reflected signals may be passed to the array of sensor pixel circuits 32. Ultrasonic energy that is reflected from the exposed (top) surface of the platen 40 may be converted into surface charge by the piezoelectric transceiver layer 56. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) to the transceiver bias electrode 59 and the sensor pixel circuits 32 on the sensor substrate 34. In some implementations, the control system 106 may operate substantially as described above. For example, the control system 106 may be configured for processing the amplified signals received from the sensor pixel circuits 32.

The control system 106 may be configured for controlling the ultrasonic transceiver array 50 to obtain ultrasonic data, which may include fingerprint data. According to some implementations, the control system 106 may be configured for providing functionality such as described herein.

In other examples of an ultrasonic fingerprint sensor with an ultrasonic transceiver array, a backside of the sensor substrate 34 may be attached directly or indirectly to an overlying platen 40. In operation, ultrasonic waves generated by the piezoelectric transceiver layer 56 may travel through the sensor substrate 34 and the platen 40, reflect off a surface of the platen 40, and travel back through the platen 40 and the sensor substrate 34 before being detected by sensor pixel circuits 32 on or in the substrate sensor 34.

Implementation examples are described in the following numbered clauses:

1. A method of controlling an apparatus that includes a fingerprint sensor system, the method comprising: controlling, via a control system, the apparatus to provide a first prompt to place a digit on an outer surface of the apparatus in a fingerprint sensor system area; determining, via the control system, a digit force or a digit pressure of the digit on the outer surface of the apparatus; and controlling, via the control system, the apparatus to provide a second prompt corresponding to the digit force or the digit pressure.

2. The method of clause 1, wherein providing the second prompt involves presenting a graphical user interface (GUI) on a display device of the apparatus.

3. The method of clause 2, wherein the GUI indicates a current digit force or a current digit pressure.

4. The method of clause 3, wherein the GUI indicates whether the current digit force or the current digit pressure is within an acceptable range.

5. The method of clause 3, wherein the GUI indicates that the current digit force or the current digit pressure is not within an acceptable range and wherein the GUI includes a prompt to change the current digit force or the current digit pressure.

6. The method of any one of clauses 3-5, wherein the GUI corresponds with a force calibration phase or a pressure calibration phase of a user enrollment process.

7. The method of any one of clauses 3-5, wherein the GUI corresponds with a fingerprint capture phase of a user enrollment process.

8. The method of any one of clauses 3-5, wherein the GUI corresponds with an authentication process.

9. The method of any one of clauses 1-8, wherein providing the first prompt involves presenting a graphical user interface (GUI) on a display device of the apparatus.

10. The method of clause 9, wherein the GUI corresponds to a user enrollment process.

11. The method of clause 9, wherein the GUI indicates the fingerprint sensor system area.

12. The method of clause 9, wherein the GUI corresponds to an authentication process.

13. The method of any one of clauses 1-12, further comprising: obtaining fingerprint image data; and determining an image quality metric corresponding to the fingerprint image data.

14. The method of clause 13, wherein the second prompt is based, at least in part, on the image quality metric.

15. The method of clause 14, wherein the second prompt indicates whether a current digit force or a current digit pressure should be changed.

16. The method of clause 13, further comprising controlling, via the control system, the apparatus to provide a third prompt based, at least in part, on the image quality metric.

17. The method of clause 16, wherein the third prompt indicates that a finger moisture level should be changed.

18. The method of any one of clauses 13-17, further comprising determining an acceptable image quality force range or an acceptable image quality pressure range associated with image quality metrics that equal or exceed an image quality metric threshold.

19. The method of clause 18, further comprising associating the acceptable image quality force range or the acceptable image quality pressure range with a person and storing the acceptable image quality force range or the acceptable image quality pressure range in a memory.

20. The method of clause 19, further comprising: performing an authentication process; and applying the acceptable image quality force range or the acceptable image quality pressure range during the authentication process.

21. The method of any one of clauses 1-20, further comprising: performing a digit enrollment process; determining digit characteristic data in addition to fingerprint image characteristic data during the digit enrollment process; and storing the digit characteristic data in a memory.

22. The method of clause 21, further comprising: performing an authentication process; and applying the digit characteristic data during the authentication process.

23. The method of clause 21 or clause 22, wherein the digit characteristic data includes one or more of digit orientation data, digit force data, digit pressure data or digit dryness data.

24. The method of any one of clauses 1-23, wherein the control system determines the digit force or the digit pressure according to fingerprint sensor data received from the fingerprint sensor system.

25. The method of clause 24, wherein the fingerprint sensor data comprise ultrasonic fingerprint sensor data.

26. The method of clause 25, wherein the ultrasonic fingerprint sensor data are received via an electrode layer proximate a piezoelectric layer.

27. The method of clause 25 or clause 26, wherein the ultrasonic fingerprint sensor data are received via an array of ultrasonic sensor pixels.

28. The method of any one of clauses 1-27, further comprising: detecting a digit dryness condition based, at least in part, on fingerprint sensor data received from the fingerprint sensor system; and controlling, via the control system, the apparatus to provide a third prompt corresponding to the digit dryness condition.

29. The method of any one of clauses 1-28, further comprising performing an spoof detection process based, at least in part, on the digit force or the digit pressure.

30. An apparatus, comprising: a fingerprint sensor system; a user interface system; and a control system configured to: determine whether a digit is on an outer surface of the apparatus in a fingerprint sensor system area; responsive to determining that the digit is on the outer surface of the apparatus in the fingerprint sensor system area, receive fingerprint sensor data from the fingerprint sensor system corresponding to the digit; determine, according to the fingerprint sensor data, a digit force or a digit pressure of the digit on the outer surface; and control the user interface system to provide a prompt corresponding to the digit force or the digit pressure.

31. The apparatus of clause 30, wherein the apparatus further comprises a display device and wherein providing the prompt involves presenting a graphical user interface (GUI) on the display device.

32. The apparatus of clause 31, wherein the GUI is configured to indicate a current digit force or a current digit pressure.

33. The apparatus of clause 32, wherein the GUI is configured to indicate whether the current digit force or the current digit pressure is within an acceptable range.

34. The apparatus of clause 32, wherein the GUI is configured to indicate that the current digit force or the current digit pressure is not within an acceptable range and wherein the GUI includes a prompt to change the current digit force or the current digit pressure.

35. The apparatus of any one of clauses 32-34, wherein the GUI corresponds with a force calibration phase or a pressure calibration phase of a user enrollment process.

36. The apparatus of any one of clauses 32-34, wherein the GUI corresponds with a fingerprint capture phase of a user enrollment process.

37. The apparatus of any one of clauses 32-34, wherein the GUI corresponds with an authentication process.

38. An apparatus, comprising: a fingerprint sensor system; a user interface system; and control means for: controlling the user interface system to provide a first prompt to place a digit on an outer surface of the apparatus in a fingerprint sensor system area; receiving fingerprint sensor data from the fingerprint sensor system corresponding to the digit; determining, based at least in part on the fingerprint sensor data, a digit force or a digit pressure of the digit on the outer surface of the apparatus; and controlling the user interface system to provide a second prompt corresponding to the digit force or the digit pressure.

39. The apparatus of clause 38, further comprising a display device, wherein providing the second prompt involves presenting a graphical user interface (GUI) on the display device.

40. The apparatus of clause 39, wherein the GUI is configured to indicate a current digit force or a current digit pressure.

41. The apparatus of clause 40, wherein the GUI is configured to indicate whether the current digit force or the current digit pressure is within an acceptable range.

42. One or more non-transitory media having software stored thereon, the software including instructions for controlling one or more devices to perform a method, the method comprising: controlling, via a control system, an apparatus to provide a first prompt to place a digit on an outer surface of the apparatus in a fingerprint sensor system area; determining, via the control system, a digit force or a digit pressure of the digit on the outer surface of the apparatus; and controlling, via the control system, the apparatus to provide a second prompt corresponding to the digit force or the digit pressure.

43. The one or more non-transitory media of clause 42, wherein providing the second prompt involves presenting a graphical user interface (GUI) on a display device of the apparatus.

44. The one or more non-transitory media of clause 43, wherein the GUI is configured to indicate a current digit force or a current digit pressure.

45. The one or more non-transitory media of clause 44, wherein the GUI is configured to indicate whether the current digit force or the current digit pressure is within an acceptable range.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. A method of controlling an apparatus that includes a fingerprint sensor system, the method comprising:
controlling, via a control system, the apparatus to provide a first prompt to place a digit on an outer surface of the apparatus in a fingerprint sensor system area;
determining, via the control system, a digit force or a digit pressure of the digit on the outer surface of the apparatus;
obtaining fingerprint image data;
determining an image quality metric corresponding to the fingerprint image data; and
controlling, via the control system, the apparatus to provide a second prompt corresponding to the digit force or the digit pressure, wherein the second prompt is based, at least in part, on the image quality metric.

2. The method of claim 1, wherein providing the second prompt involves presenting a graphical user interface (GUI) on a display device of the apparatus.

3. The method of claim 2, wherein the GUI indicates a current digit force or a current digit pressure.

4. The method of claim 3, wherein the GUI indicates whether the current digit force or the current digit pressure is within an acceptable range.

5. The method of claim 3, wherein the GUI indicates that the current digit force or the current digit pressure is not within an acceptable range and wherein the GUI includes a prompt to change the current digit force or the current digit pressure.

6. The method of claim 3, wherein the GUI corresponds with a force calibration phase or a pressure calibration phase of a user enrollment process.

7. The method of claim 3, wherein the GUI corresponds with a fingerprint capture phase of a user enrollment process.

8. The method of claim 3, wherein the GUI corresponds with an authentication process.

9. The method of claim 1, wherein providing the first prompt involves presenting a graphical user interface (GUI) on a display device of the apparatus.

10. The method of claim 9, wherein the GUI corresponds to a user enrollment process.

11. The method of claim 9, wherein the GUI indicates the fingerprint sensor system area.

12. The method of claim 9, wherein the GUI corresponds to an authentication process.

13. The method of claim 1, wherein the second prompt indicates whether a current digit force or a current digit pressure should be changed.

14. The method of claim 1, further comprising controlling, via the control system, the apparatus to provide a third prompt based, at least in part, on the image quality metric.

15. The method of claim 14, wherein the third prompt indicates that a finger moisture level should be changed.

16. The method of claim 1, further comprising determining an acceptable image quality force range or an acceptable image quality pressure range associated with image quality metrics that equal or exceed an image quality metric threshold.

17. The method of claim 16, further comprising associating the acceptable image quality force range or the acceptable image quality pressure range with a person and storing the acceptable image quality force range or the acceptable image quality pressure range in a memory.

18. The method of claim 17, further comprising:
performing an authentication process; and
applying the acceptable image quality force range or the acceptable image quality pressure range during the authentication process.

19. The method of claim 1, further comprising:
performing a digit enrollment process;
determining digit characteristic data in addition to fingerprint image characteristic data during the digit enrollment process; and
storing the digit characteristic data in a memory.

20. The method of claim 19, further comprising:
performing an authentication process; and
applying the digit characteristic data during the authentication process.

21. The method of claim 19, wherein the digit characteristic data includes one or more of digit orientation data, digit force data, digit pressure data or digit dryness data.

22. The method of claim 1, wherein the control system determines the digit force or the digit pressure according to fingerprint sensor data received from the fingerprint sensor system.

23. The method of claim 22, wherein the fingerprint sensor data comprise ultrasonic fingerprint sensor data.

24. The method of claim 23, wherein the ultrasonic fingerprint sensor data are received via an electrode layer proximate a piezoelectric layer.

25. The method of claim 23, wherein the ultrasonic fingerprint sensor data are received via an array of ultrasonic sensor pixels.

26. The method of claim 1, further comprising:
detecting a digit dryness condition based, at least in part, on fingerprint sensor data received from the fingerprint sensor system; and
controlling, via the control system, the apparatus to provide a third prompt corresponding to the digit dryness condition.

27. The method of claim 1, further comprising performing a spoof detection process based, at least in part, on the digit force or the digit pressure.

28. An apparatus, comprising:
a fingerprint sensor system;
a user interface system; and
a control system configured to:
determine whether a digit is on an outer surface of the apparatus in a fingerprint sensor system area;
responsive to determining that the digit is on the outer surface of the apparatus in the fingerprint sensor system area, receive fingerprint sensor data from the fingerprint sensor system corresponding to the digit;
determine, according to the fingerprint sensor data, a digit force or a digit pressure of the digit on the outer surface;
obtain fingerprint image data;
determine an image quality metric corresponding to the fingerprint image data; and
control the user interface system to provide a prompt corresponding to the digit force or the digit pressure, wherein the second prompt is based, at least in part, on the image quality metric.

29. The apparatus of claim 28, wherein the apparatus further comprises a display device and wherein providing the prompt involves presenting a graphical user interface (GUI) on the display device.

30. The apparatus of claim 29, wherein the GUI is configured to indicate a current digit force or a current digit pressure.

31. The apparatus of claim 30, wherein the GUI is configured to indicate whether the current digit force or the current digit pressure is within an acceptable range.

32. The apparatus of claim 30, wherein the GUI is configured to indicate that the current digit force or the current digit pressure is not within an acceptable range and wherein the GUI includes a prompt to change the current digit force or the current digit pressure.

33. The apparatus of claim 30, wherein the GUI corresponds with a force calibration phase or a pressure calibration phase of a user enrollment process.

34. The apparatus of claim 30, wherein the GUI corresponds with a fingerprint capture phase of a user enrollment process.

35. The apparatus of claim 30, wherein the GUI corresponds with an authentication process.

36. An apparatus, comprising:
a fingerprint sensor system;
a user interface system; and
control means for:
controlling the user interface system to provide a first prompt to place a digit on an outer surface of the apparatus in a fingerprint sensor system area;
receiving fingerprint sensor data from the fingerprint sensor system corresponding to the digit;
determining, based at least in part on the fingerprint sensor data, a digit force or a digit pressure of the digit on the outer surface of the apparatus;
obtaining fingerprint image data;
determining an image quality metric corresponding to the fingerprint image data; and
controlling the user interface system to provide a second prompt corresponding to the digit force or the digit pressure, wherein the second prompt is based, at least in part, on the image quality metric.

37. The apparatus of claim 36, further comprising a display device, wherein providing the second prompt involves presenting a graphical user interface (GUI) on the display device.

38. The apparatus of claim 37, wherein the GUI is configured to indicate a current digit force or a current digit pressure.

39. The apparatus of claim 38, wherein the GUI is configured to indicate whether the current digit force or the current digit pressure is within an acceptable range.

40. One or more non-transitory media having software stored thereon, the software including instructions for controlling one or more devices to perform a method, the method comprising:
controlling, via a control system, an apparatus to provide a first prompt to place a digit on an outer surface of the apparatus in a fingerprint sensor system area;
determining, via the control system, a digit force or a digit pressure of the digit on the outer surface of the apparatus;
obtaining fingerprint image data;
determining an image quality metric corresponding to the fingerprint image data; and
controlling, via the control system, the apparatus to provide a second prompt corresponding to the digit force or the digit pressure, wherein the second prompt is based, at least in part, on the image quality metric.

41. The one or more non-transitory media of claim 40, wherein providing the second prompt involves presenting a graphical user interface (GUI) on a display device of the apparatus.

42. The one or more non-transitory media of claim 41, wherein the GUI is configured to indicate a current digit force or a current digit pressure.

43. The one or more non-transitory media of claim 42, wherein the GUI is configured to indicate whether the current digit force or the current digit pressure is within an acceptable range.

* * * * *